US010318015B2

(12) United States Patent
Goto et al.

(10) Patent No.: US 10,318,015 B2
(45) Date of Patent: Jun. 11, 2019

(54) INFORMATION PROCESSING FOR CONTROLLING MOVEMENT OF DISPLAYED OBJECT

(75) Inventors: Tetsuro Goto, Tokyo (JP); Shinobu Kuriya, Kanagawa (JP); Kenichi Kabasawa, Saitama (JP); Masatoshi Ueno, Kanagawa (JP); Hideo Kawabe, Saitama (JP); Toshiyuki Nakagawa, Kanagawa (JP); Tsubasa Tsukahara, Tokyo (JP)

(73) Assignee: Sony Corporation, Tokyo (JP)

( * ) Notice: Subject to any disclaimer, the term of this patent is extended or adjusted under 35 U.S.C. 154(b) by 829 days.

(21) Appl. No.: 13/339,979

(22) Filed: Dec. 29, 2011

(65) Prior Publication Data

US 2012/0179408 A1 Jul. 12, 2012

(30) Foreign Application Priority Data

Jan. 6, 2011 (JP) ................................. 2011-001240

(51) Int. Cl.
*G06F 3/0346* (2013.01)

(52) U.S. Cl.
CPC ................................ *G06F 3/0346* (2013.01)

(58) Field of Classification Search
CPC ............................... G06F 3/033; G06F 3/0346
USPC ...... 345/156, 8, 418, 501, 204, 30, 949, 960
See application file for complete search history.

(56) References Cited

U.S. PATENT DOCUMENTS

| 7,262,760 B2 | 8/2007 | Liberty |
| 8,677,820 B2* | 3/2014 | Nakagawa et al. ......... 73/379.02 |
| 8,677,838 B2* | 3/2014 | Kawabe et al. ........... 73/862.381 |
| 2007/0171202 A1* | 7/2007 | Yang ...................... G06F 3/0346 345/158 |
| 2007/0211025 A1* | 9/2007 | Sato ............................. 345/158 |
| 2010/0001953 A1* | 1/2010 | Yamamoto et al. .......... 345/158 |
| 2010/0103096 A1* | 4/2010 | Yamamoto ............ G06F 3/0383 345/157 |
| 2011/0003641 A1* | 1/2011 | Asami ................ A63B 24/0006 463/37 |
| 2012/0176309 A1* | 7/2012 | Yang ...................... G06F 3/0346 345/157 |

FOREIGN PATENT DOCUMENTS

| JP | 06-095801 A | 4/1994 |
| JP | 08-185254 A | 7/1996 |

(Continued)

*Primary Examiner* — Stephanie E Bloss
*Assistant Examiner* — Lisa E Peters
(74) *Attorney, Agent, or Firm* — Chip Law Group

(57) ABSTRACT

An information processing apparatus includes: an operation unit configured to calculate, based on information on an acceleration detected by an acceleration sensor included in an operation device that is operated by a user, movement information as information on one of a velocity and a movement distance of the operation device; and a correction unit configured to correct, based on information obtained by the acceleration sensor within an acceleration period as a period between an acceleration start time and an acceleration end time of the operation device, the movement information of the operation device within a period between the acceleration end time of the operation device and a movement end time at which the movement ends, that is calculated by the operation unit.

12 Claims, 20 Drawing Sheets

(56) References Cited

FOREIGN PATENT DOCUMENTS

| | | |
|---|---|---|
| JP | 10-179935 A | 7/1998 |
| JP | 10-269011 A | 10/1998 |
| JP | 2002-123365 A | 4/2002 |
| JP | 2008-246084 A | 10/2008 |
| JP | 2008-305044 A | 12/2008 |
| WO | WO 2009/008372 A1 | 1/2009 |

* cited by examiner a: Stop state b: Acceleration state (positive acceleration increase)

c: Acceleration state (positive acceleration decrease)

d: Deceleration state (negative acceleration increase)

e: Deceleration state (negative acceleration decrease)

f: Stop state

INFORMATION PROCESSING FOR CONTROLLING MOVEMENT OF DISPLAYED OBJECT

BACKGROUND

The present disclosure relates to an information processing apparatus, an information processing system, and an information processing method with which, based on information obtained from an acceleration sensor and the like included in an operation device at a time the operation device is operated 3-dimensionally by a user, an operation for realizing movements of an operation object that correspond to the movements of the operation device is executed.

In general, an operation device that is operated 3-dimensionally includes an acceleration sensor and calculates a movement distance of the operation device by doubly integrating an acceleration obtained by the acceleration sensor. By the double integration operation, however, there have been problems that there are large errors in the movement distances as the operation results, and such errors are accumulated as the number of integrations increases. In this regard, it has been necessary to perform a correction of some sort on the operation of a movement distance.

An operation device (input apparatus) disclosed in Japanese Patent Application Laid-open No. 2008-305044 includes an acceleration sensor and an angular velocity sensor. A method of correcting a velocity obtained by integrating an acceleration obtained by the acceleration sensor once using an angular velocity and angular acceleration obtained by the angular velocity sensor in the input apparatus is disclosed.

Incidentally, when a user grabs the operation device and operates it 3-dimensionally, even when the user intends to operate it so as to move it linearly, the user makes an operation to swing the operation device about a wrist or an elbow. Therefore, since the movement of the operation device operated as described above includes a curved movement or a rotational movement, there have been problems that errors are included in the movement distances as the operation results, and practical detection accuracy of velocities and movement distances as a device that detects movement operations cannot be realized.

For solving the problems as described above, devices disclosed in WO 2009/008372 and U.S. Pat. No. 7,262,760 (hereinafter, referred to as Patent Document 1 and Patent Document 2, respectively) are proposed. Those devices each include an acceleration sensor and an angular velocity sensor. Those devices each calculate a positional angle (tilt) of the device using a detection value of the acceleration sensor and convert a detection value obtained by the angular velocity sensor (or acceleration sensor) into a value of a standard coordinate system (ground-fixed global coordinate system) based on the positional angle. As a result, errors accompanying the curved movements and rotational movements of the devices are reduced.

SUMMARY

However, considering characteristics of the acceleration sensor, detection values obtained by adding movement accelerations (inertial accelerations) in addition to gravity accelerations are output during movement operations of the operation device. For example, FIG. 34 of Patent Document 2 discloses correction operation processing for removing an influence of movement accelerations as described above, but there is a fear that an accumulation of errors may increase due to the operation processing particularly in a latter half of the movement operation of the operation device, that is, during deceleration.

Further, in the operation device equipped with the acceleration sensor and the angular velocity sensor as described above, there is a fear that, when carrying out an integration operation of accelerations and angular velocities detected by those sensors, detection accuracy of velocities and movement distances may lower due to the accumulation of operational errors as described above during deceleration in the latter half of the movement operation of the operation device.

In view of the circumstances as described above, there is a need for an information processing apparatus, an information processing system, and an information processing method with which detection accuracy of velocities and movement distances can be prevented from being lowered due to an accumulation of errors caused by operation processing, and practical detection accuracy of velocities and movement distance can be realized.

According to an embodiment of the present disclosure, there is provided an information processing apparatus including an operation unit and a correction unit.

The operation unit calculates, based on information on an acceleration detected by an acceleration sensor included in an operation device that is operated by a user, movement information as information on one of a velocity and a movement distance of the operation device.

The correction unit corrects, based on information obtained by the acceleration sensor within an acceleration period as a period between an acceleration start time and an acceleration end time of the operation device, the movement information of the operation device within a period between the acceleration end time of the operation device and a movement end time at which the movement ends, that is calculated by the operation unit.

The accumulation of operational errors included in the movement information obtained within the acceleration period is relatively small. Therefore, in the embodiment of the present disclosure, information of the operation result on the movement of the operation device within the period between the acceleration end time and the movement end time is corrected based on the information obtained during such an acceleration period. As a result, movement detection accuracy can be prevented from being lowered due to the accumulation of errors caused by the operation processing, and practical movement detection accuracy can be realized.

The information obtained within the acceleration period also includes information of the operation result obtained by the operation unit.

The correction unit may include a unit configured to measure at least a partial time within the acceleration period by the acceleration sensor and a unit configured to calculate, based on the measured time, an estimated movement end time as an estimated time at which the movement of the operation device ends. In this case, the correction unit corrects the movement information of at least a partial time within a period between the acceleration end time and the calculated estimated movement end time. When the user moves the operation device, the time the movement of the operation device ends can be estimated to a certain degree from at least a partial period within the acceleration period. The correction unit corrects the movement information before the estimated movement end time using the estimated (calculated) estimated movement end time.

The correction unit may set the velocity out of the movement information to be constant from the acceleration end time and set the velocity to 0 at the estimated movement end time.

The correction unit may decelerate the velocity after the acceleration end time such that the velocity out of the movement information becomes 0 at the estimated movement end time. With this structure, natural movements of the operation object that correspond to the movements of the operation device can be realized.

The correction unit may converge the movement distance out of the movement information to discrete values at a certain interval before the estimated movement end time.

The correction unit may calculate, as the estimated movement end time, a time at which a time corresponding to the acceleration period has elapsed since the acceleration end time. When the user moves the operation device, a time corresponding to the acceleration period and a time corresponding to the deceleration period are known to be of close values. Therefore, according to the embodiment of the present disclosure, the movement end time can be estimated without carrying out complicated operations.

The correction unit may calculate, as the estimated movement end time, a time that a predetermined time is added or subtracted to/from a time at which a time corresponding to the acceleration period has elapsed since the acceleration end time. The period between the acceleration end time and the movement end time may be a little longer or shorter than the time corresponding to the acceleration period. In such cases, by setting a predetermined time as appropriate, the movement end time can be estimated without carrying out complicated operations.

The correction unit may variably control the predetermined time based on the movement information calculated by the operation unit. By dynamically changing the predetermined time based on the movement information, accurate movements corresponding to the operation device can be detected.

The correction unit may set the predetermined time by comparing the movement information at the acceleration end time with a threshold value.

The information processing apparatus may further include an operation state acquisition unit configured to acquire information on an operation state of the operation device operated by the user. In this case, the correction unit corrects the movement information based on the information on an operation state obtained within at least a partial period out of the period between the acceleration end time and the calculated estimated movement end time. With this structure, various movements of the operation object that correspond to the operation states of the user during the period between the acceleration end time and the estimated movement end time can be realized.

The operation state acquisition unit may acquire the acceleration detected by the acceleration sensor, and the correction unit may correct the movement information based on the acquired acceleration.

The operation state acquisition unit may acquire an angular velocity detected by an angular velocity sensor that is additionally included in the operation device, and the correction unit may correct the movement information based on the acquired angular velocity.

The operation state acquisition unit may acquire a pressure with which the user grabs the operation device and that is detected by a pressure sensor that is additionally included in the operation device, and the correction unit may correct the movement information based on the acquired pressure.

The operation state acquisition unit may acquire a signal detected by a mechanical switch that is additionally included in the operation device and is operated by the user, and the correction unit may correct the movement information based on the acquired signal.

The correction unit may change the estimated movement end time based on the information on an operation state obtained within at least a partial period out of the period between the acceleration end time and the calculated estimated movement end time.

The operation state acquisition unit may acquire the acceleration detected by the acceleration sensor, and the correction unit may change the estimated movement end time based on the acquired acceleration.

The operation state acquisition unit may acquire an acceleration once at a predetermined timing within the partial period or periodically (also includes successively) acquire the accelerations within that period. In this case, a change unit may change the estimated movement end time once based on the acceleration acquired only once or periodically (also includes successively) change the estimated movement end time based on the periodically (also includes successively)-acquired accelerations. In addition to the acceleration, this also holds true for the angular velocity detected by the angular velocity sensor, the pressure detected by the pressure sensor, and the signal detected by the mechanical switch.

The operation state acquisition unit may acquire an angular velocity detected by an angular velocity sensor that is additionally included in the operation device, and the correction unit may change the estimated movement end time based on the acquired angular velocity.

The operation state acquisition unit may acquire a pressure with which the user grabs the operation device and that is detected by a pressure sensor that is additionally included in the operation device, and the correction unit may change the estimated movement end time based on the acquired pressure.

The operation state acquisition unit may acquire a signal detected by a mechanical switch that is additionally included in the operation device and is operated by the user, and the correction unit may change the estimated movement end time based on the acquired signal.

According to an embodiment of the present disclosure, there is provided an information processing system including an operation device and a control apparatus.

The operation device is operated by a user and includes an acceleration sensor and a transmission unit configured to transmit information on an acceleration detected by the acceleration sensor.

The control apparatus includes a reception unit, an operation unit, and a correction unit.

The reception unit is configured to receive the information on an acceleration transmitted by the transmission unit of the operation device.

The operation unit is configured to calculate, based on the received information on an acceleration, movement information as information on one of a velocity and a movement distance of the operation device. The correction unit is configured to correct, based on information obtained by the acceleration sensor within an acceleration period as a period between an acceleration start time and an acceleration end time of the operation device, the movement information of the operation device within a period between the acceleration end time of the operation device and a movement end time at which the movement ends, that is calculated by the operation unit. The control apparatus controls an operation object of the operation device based on the corrected movement information.

According to an embodiment of the present disclosure, there is provided an information processing method for a computer, including calculating, based on information on an acceleration detected by an acceleration sensor included in an operation device that is operated by a user, movement information as information on one of a velocity and a movement distance of the operation device.

Based on information obtained by the acceleration sensor within an acceleration period as a period between an acceleration start time and an acceleration end time of the operation device, the calculated movement information of the operation device that is within a period between the acceleration end time of the operation device and a movement end time at which the movement ends is corrected.

As described above, according to the embodiments of the present disclosure, detection accuracy of velocities and movement distances can be prevented from being lowered due to an accumulation of errors caused by operation processing, and practical detection accuracy of velocities and movement distances can be realized.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

(Structure of Information Processing System)

Figure 1:
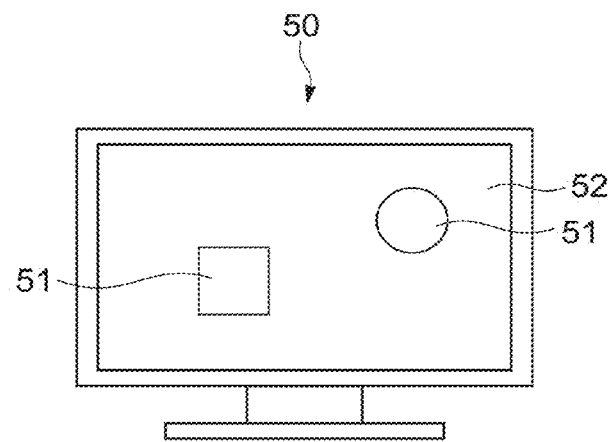
FIG. 1 is a diagram showing an information processing system according to an embodiment of the present disclosure.

FIG. 1 is a diagram showing an information processing system according to an embodiment of the present disclosure.

The information processing system includes an operation device 10 that is operated by a user and a display device 50 that receives operation information transmitted from the operation device 10 and executes display processing based on the received information. The operation device 10 and the display device 50 are electrically connected and wirelessly communicate with each other using infrared rays, radio waves, and the like in this embodiment The operation device 10 is of a size that a user is capable of holding and has, for example, a spherical shape. The shape of the operation device 10 is not limited to a sphere and may be other shapes (shapes other than sphere) with which the user can recognize a direction or position of the operation device 10. The display device 50 functions as a control apparatus that executes display control to, for example, turn and move an object (operation object) 51 that has been operated by a user operation using the operation device 10 on a screen of a display unit 52.

A typical example of the display device 50 is an apparatus capable of displaying a 3D (Dimension) object 51, such as a 3D TV. The operation object is not limited to a 3D image and may instead be a 2D image such as an icon and a pointer. Alternatively, an icon, a pointer, and the like may be displayed as 3D images.

Figure 2:
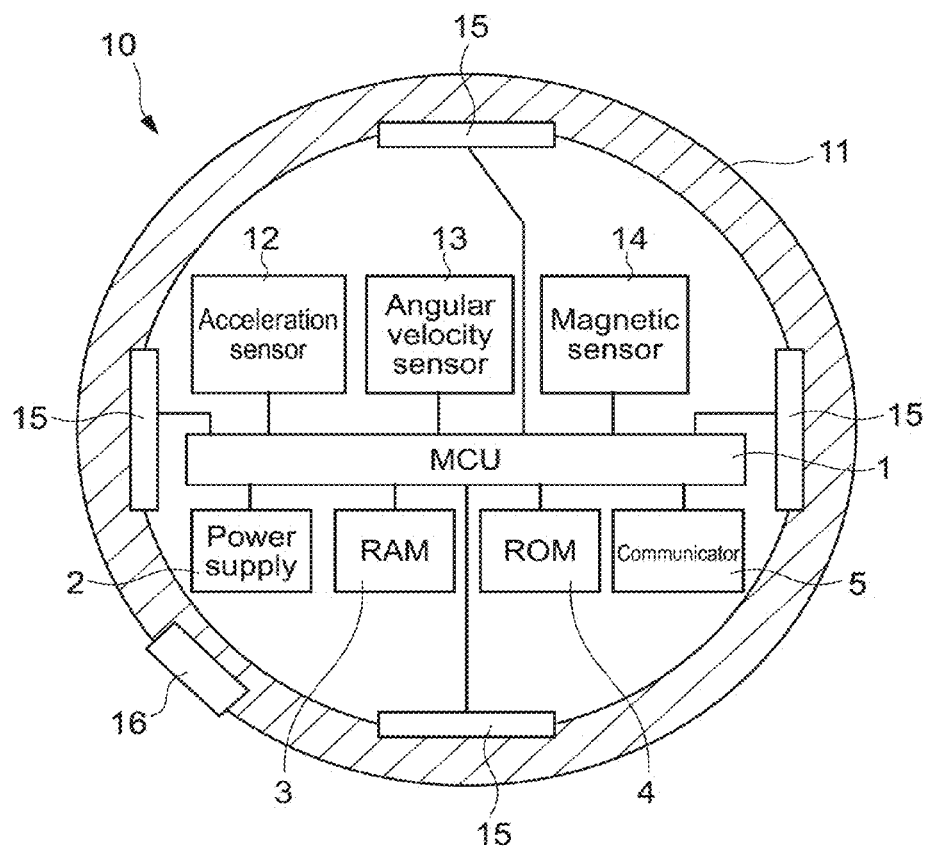
FIG. 2 is a diagram showing a hardware structure of an operation device.

FIG. 2 is a diagram showing a hardware structure of the operation device 10. The operation device 10 includes an MCU (Micro Control Unit) 1, a power supply 2, a RAM 3, a ROM 4, a communicator 5, an acceleration sensor 12, an angular velocity sensor 13, a magnetic sensor 14, pressure sensors 15, a mechanical switch 16, and the like. The operation device 10 also includes a rewritable memory (not shown). Programmable hardware such as FPGA (Field Programmable Gate Array) may be used in place of the MCU 1.

The acceleration sensor 12 and the angular velocity sensor 13 typically include 3 orthogonal detection axes or 2 orthogonal detection axes.

The hardware is provided inside a spherical casing 11 and fixed to the casing 11. The plurality of pressure sensors 15 are attached on an inner surface side of the casing 11, for example, and such a group of pressure sensors detect positions pressurized by the user and pressures thereof. The mechanical switch 16 is a mechanical switch such as a press button and a DIP switch that the user operates by touching it. When the mechanical switch 16 is operated by the user, binary ON/OFF electric signals or electric signals of 3 values or more are generated. Herein, the communicator 5 mainly functions as a transmitter.

The acceleration sensor 12, the angular velocity sensor 13, and the magnetic sensor 14 are all packaged in a single common package. Alternatively, the acceleration sensor 12, the angular velocity sensor 13, and the magnetic sensor 14 may be packaged separately and mounted on a single common sensor substrate.

Figure 3:
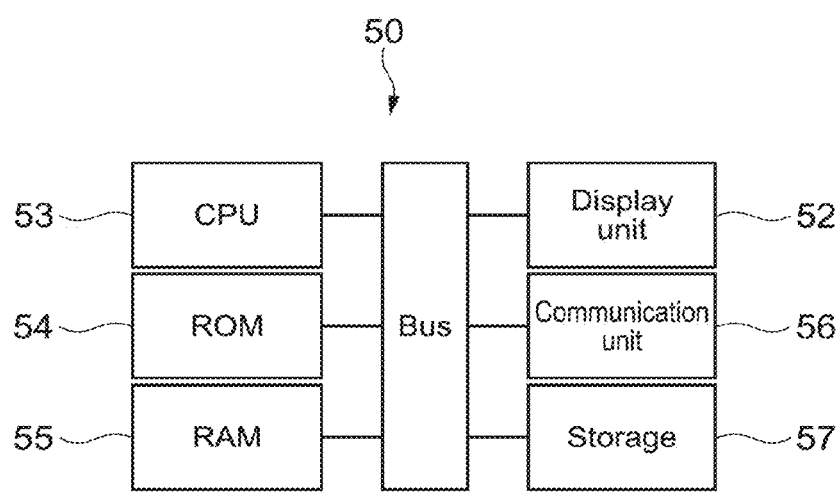
FIG. 3 is a diagram showing a hardware structure of a display device.

FIG. 3 is a diagram showing a hardware structure of the display device 50. The display device 50 includes a CPU 53, a ROM 54, and a RAM 55 as in a general computer, and also includes a display unit 52, a communication unit 56, and a storage 57. Herein, the communication unit 56 mainly functions as a receiver. The storage 57 is typically a subsidiary (secondary) storage with respect to the ROM 54 and the RAM 55.

It should be noted that the display device 50 includes a structure in which a control portion (control apparatus) that receives information transmitted from the operation device 10 and controls display of the object 51 is integrated with the display unit 52. However, the control portion and the display unit 52 may be provided separately and connected to each other while being capable of communicating with each other in a wired or wireless manner.

Figure 4:
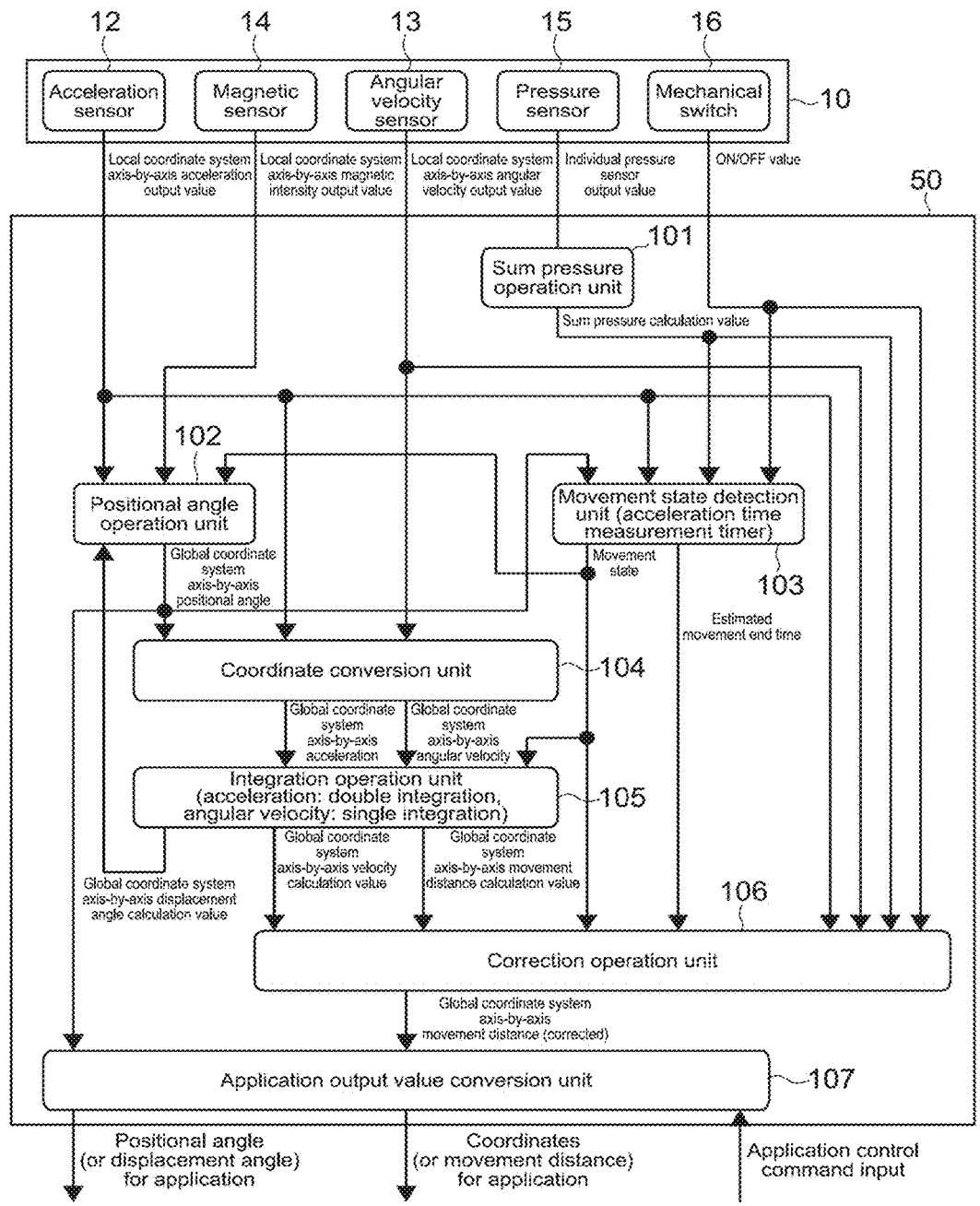
FIG. 4 is a functional block diagram simultaneously expressing a flowchart of processing that the operation device and the display device carry out.

The ROM 4 and memory (not shown) of the operation device 10 and/or the ROM 54 and storage 57 of the display device 50 store software for realizing processing shown in FIG. 4, and the like. FIG. 4 is a functional block diagram showing processing that the operation device 10 and the display device 50 carry out. In this example, the display device 50 functions as an information processing apparatus that has a characteristic technique according to this embodiment.

Typically, information output from the sensors 12 to 15 and mechanical switch 16 of the operation device 10 is transmitted to the display device 50 via the communicator 5 (see FIG. 2), and the display device 50 receives the information via the communication unit 56 (see FIG. 3). Then, the display device 50 executes processing at respective units.

Figure 5:
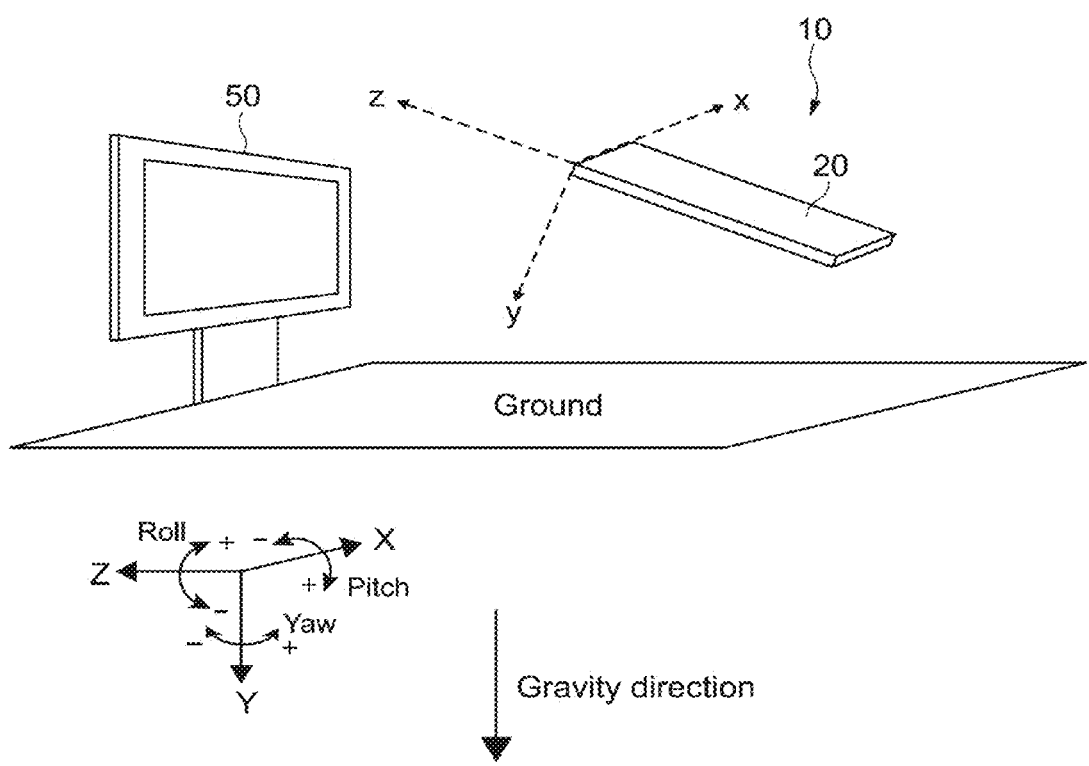
FIG. 5 is a diagram showing a relationship between a local coordinate system and a global coordinate system.

FIG. 5 is a diagram showing a relationship between a local coordinate system and a global coordinate system.

The display device 50 is placed on the ground. Here, a coordinate system fixed to the ground or the display device 50 is called global coordinate system, whereas a coordinate system that freely moves with respect to the global coordinate system and is fixed to a sensor substrate 20 of the operation device 10 is called local coordinate system. The sensor substrate 20 is, as described above, a common substrate on which the acceleration sensor 12, the angular velocity sensor 13, and the magnetic sensor 14 are mounted.

(Operation Processing Method of Information Processing System)

Referring to FIG. 4, a positional angle operation unit 102 calculates a positional angle of the operation device 10 based on detection values detected by the acceleration sensor 12 and the magnetic sensor 14. The calculation of a positional angle can be realized by various well-known methods.

For example, using a trigonometric function, the positional angle of the operation device 10 (global positional angle) in the global coordinate system is calculated based on accelerations of 3 orthogonal axes and magnetic intensities of the 3 orthogonal axes detected by the acceleration sensor 12 and the magnetic sensor 14.

The method is not limited to such a method, and the global positional angle can also be calculated using angular velocities detected by the angular velocity sensor 13 and the accelerations detected by the acceleration sensor 12. Alternatively, the global positional angle can be calculated using angular velocities and magnetic intensities.

A coordinate conversion unit 104 converts accelerations and angular velocities detected in the local coordinate system into accelerations and angular velocities in the global coordinate system using the global positional angle calculated as described above. Such a conversion can be realized by a rotational coordinate conversion that uses a trigonometric function regarding the global positional angle.

A movement state detection unit 103 detects information on a movement state of the operation device 10 operated by the user. The information on a movement state (operation state) is information obtained from detection values obtained by the sensors 12 and 13, a sum pressure calculated by a sum pressure operation unit 101, and a signal from the mechanical switch 16.

It should be noted that the sum pressure operation unit 101 is a sum of pressures detected by the group of pressure sensors 15. The pressure used in the operation is not limited to a sum pressure and may be, for example, a pressure from a single pressure sensor, a mean value of the pressures detected by the group of pressure sensors 15, or a pressure calculated by other operational methods.

Further, the movement state detection unit 103 includes a function as a timer (measurement unit) that measures a time such as an acceleration period and a deceleration period of the operation device 10 as information related to an acceleration.

An integration operation unit 105 integrates accelerations and angular velocities converted by the coordinate conversion unit. A movement distance is calculated by doubly integrating an acceleration, and an angle is calculated by integrating an angular velocity once. A velocity is also calculated by integrating an acceleration once.

The angle obtained by integrating an angular velocity (displacement angle) is returned to the coordinate conversion unit 104 in, for example, a second processing loop, and the coordinate conversion unit 104 executes the rotational coordinate conversion using the obtained angle. As described above, in the second processing loop, by using an angular velocity instead of a detection value obtained by the acceleration sensor 12, operational errors can be suppressed. This is because, since a movement acceleration (inertial acceleration) is added to a gravity acceleration detected by the acceleration sensor 12 while the user is operating the operation device 10, an accurate global positional angle may not be calculated.

It should be noted that the integration operation unit 105 does not necessarily need to execute the integration operation of angular velocities.

The positional angle operation unit 102, the coordinate conversion unit 104, and the integration operation unit 105 function as an operation unit.

A correction operation unit 106 that functions as a part of a correction unit corrects movement information as information on a velocity or movement distance output from the integration operation unit 105. This will be described later.

An application output value conversion unit 107 converts at least the corrected information on a velocity or movement distance output from the correction operation unit 106 into an output value for application software used for the display device 50 to display an object on the screen.

The flow of processing from the respective units 101 to 107 described above is repetitively executed at a predetermined frequency.

(Regarding Characteristics of Acceleration when Human being Operates Operation Device)

Figure 6:
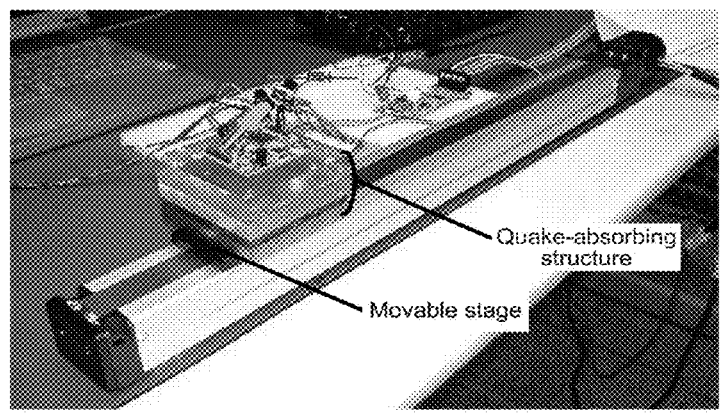
FIG. 6 is a photograph of a mechanical movement stage that the inventors of the present disclosure have used in the experiments for measuring accelerations.

Here, accelerations detected by the acceleration sensor when a human being and a machine linearly move the operation device 10 will be described. FIG. 6 is a photograph of an apparatus that the inventors of the present disclosure have used in the experiments. The apparatus is a mechanical movement stage that includes a state that moves linearly in a single dimension and is freely movable by a computer program.

Figure 7:
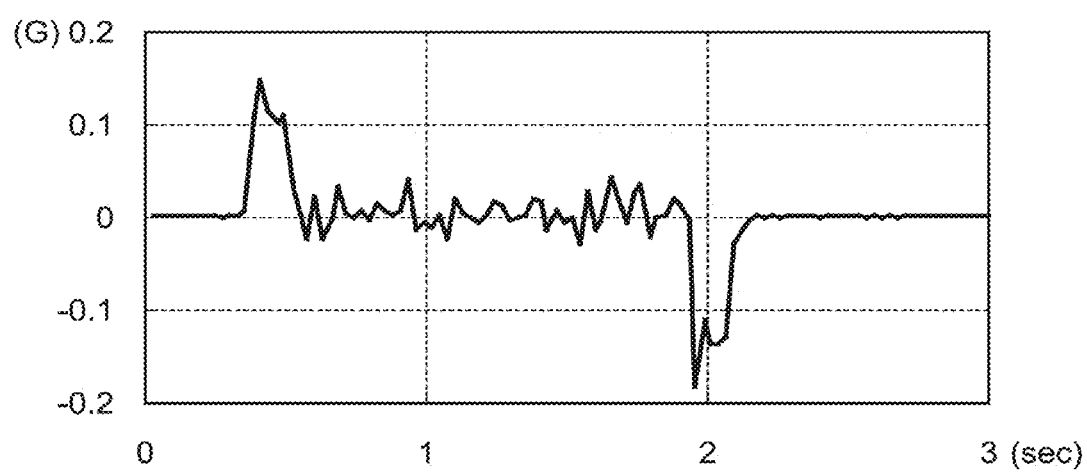
FIG. 7 is a diagram showing a profile of an output waveform of an acceleration detected by an acceleration sensor when the acceleration sensor is fixed on the mechanical movement stage and the stage is moved while maintaining a constant velocity.

FIG. 7 is a diagram showing a profile of an output waveform of an acceleration detected by the acceleration sensor when the acceleration sensor is fixed on the mechanical movement stage and the stage is moved while maintaining a constant velocity. The acceleration sensor is set on the stage such that a movement axis of the stage (i.e., global coordinate axis) and a detection axis of the acceleration sensor match. A peak acceleration is about 0.15 G.

As shown in the figure, profiles of the acceleration period (+ side of graph), the constant-velocity period, and the deceleration period (− side of graph) clearly appear.

Figure 8:
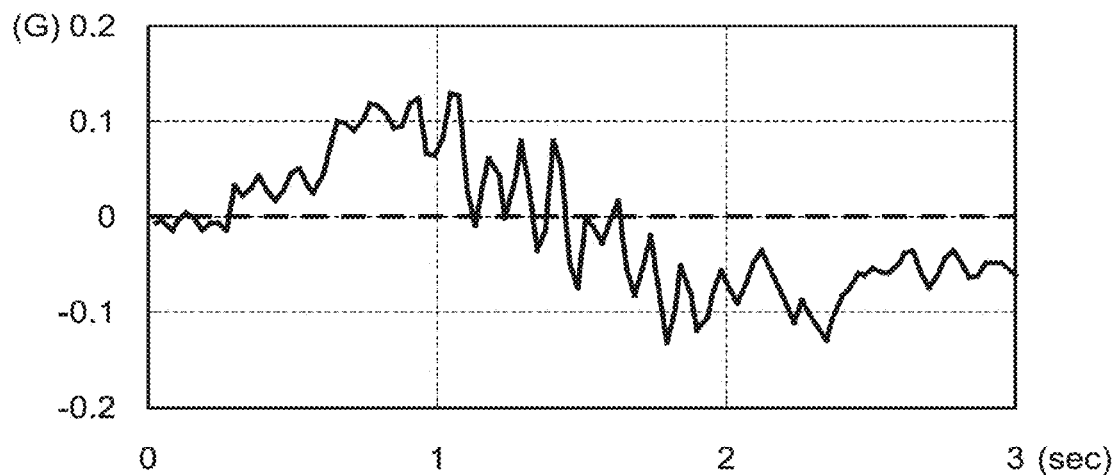
FIG. 8 is a diagram showing a profile of the acceleration output waveform in a case where a human being grabs the operation device and moves it linearly.

FIG. 8 is a diagram showing a profile of the acceleration output waveform in a case where a human being grabs (the operation device 10 including) the acceleration sensor 12 and moves it linearly. Specifically, by consciously moving an arm to keep a constant velocity, a human being moves the operation device 10 such that one of the detection axes (local axes) of the local coordinate system of the acceleration sensor 12 and one axis of the global coordinate system match.

As shown in the figure, even when a human being intends to consciously operate the operation device at a constant velocity with a free hand, a profile in which the acceleration, constant velocity, and deceleration clearly appear as in the profile shown in FIG. 7 did not appear. In FIG. 8, a profile in which the "acceleration" gradually and consecutively shifts to "deceleration" was obtained.

Further, more waveform disturbances, that is, more hand movements during a movement operation than in FIG. 7 occurred.

Figure 9:
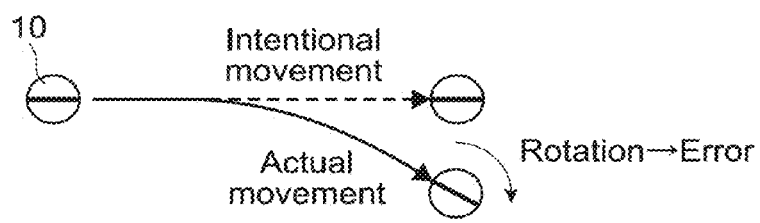
FIG. 9 is a diagram showing a movement of the operation device at a time a human being unconsciously changes a movement direction (curved movement) or turns the operation device itself (rotational movement) while moving the operation device.

Furthermore, even during a stop after the movement is ended, the acceleration on the − side is detected without becoming the acceleration before the start of the movement (practically 0 G). This is because, as shown in FIG. 9, a gravity acceleration (or fluctuation thereof) is detected on the local axis of the acceleration sensor as a result of the user unconsciously changing the movement direction (curved movement) or turning the operation device 10 itself (rotational movement) during the movement operation.

Due to detection errors of the acceleration sensor that are caused by the hand movement, the curved movement, and the rotational movement, an error is caused in the movement information as information on a velocity or movement distance obtained by the operation (including integration) at the time a human being operates the operation device 10 with a free hand.

It should be noted that the curved movement and rotational movement used herein are concepts included in the rotational movement in a broad sense which refers to both the rotational and revolutionary movements of the operation device 10. In other words, the rotational movement in a broad sense refers to the way the user operates the operation device 10 such that angular velocities are detected by the angular velocity sensor 13 due to the rotational movement.

Figure 10:
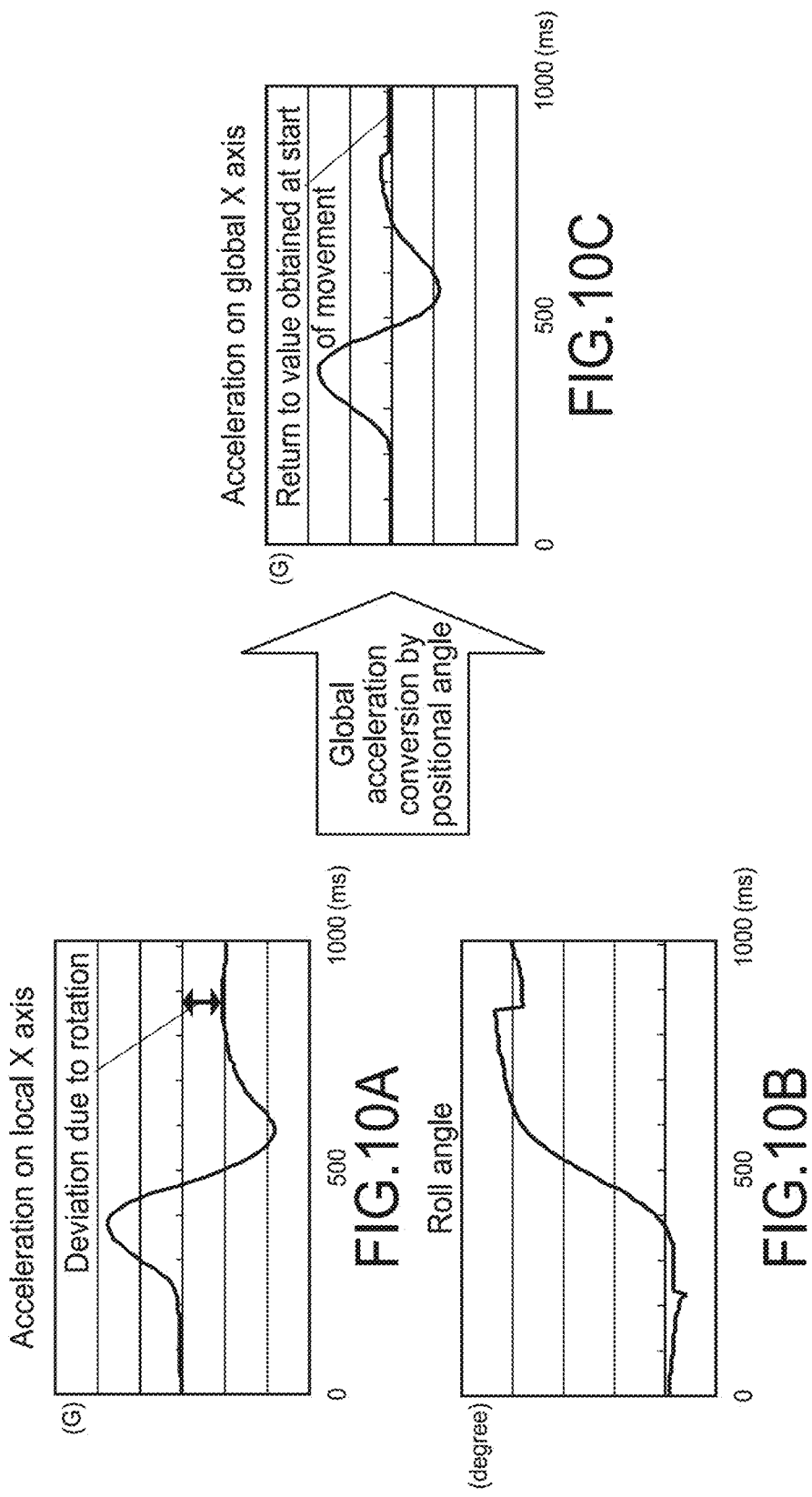
FIG. 10A is a profile of an acceleration on a local X axis.
FIG. 10B is a profile of a roll angle at a time a rotational movement about a Z axis is made.
FIG. 10C is a profile of a corrected acceleration on a global X axis.

Operational errors due to the curved movement and rotational movement as described above are suppressed by coordinate conversion processing from the local coordinate system to the global coordinate system as described above. FIG. 10A is a profile of an acceleration detected on a local X axis (see FIG. 5). For example, in a case where a rotational movement about a global Z axis (movement in roll-angle direction) is made during deceleration as shown in FIG. 10B, a component of a gravity acceleration is detected in the acceleration on the local X axis as in the acceleration shown in FIG. 8. By executing processing by the positional angle operation unit 102 and the coordinate conversion unit 104, the errors caused by the rotational movements as described above are corrected as shown in FIG. 10C.

Even when such a correction is made, since a detection value in which a movement acceleration (inertial acceleration) is added in addition to the gravity acceleration is output during a movement operation of the operation device due to the characteristics of the acceleration sensor, operational errors are accumulated as time elapses since the start of the operation processing.

Further, since drift errors of sensor devices themselves are generally caused in the acceleration sensor and the angular velocity sensor, operational errors are similarly accumulated as time elapses since the start of the operation processing while movement information is calculated.

Figure 11:
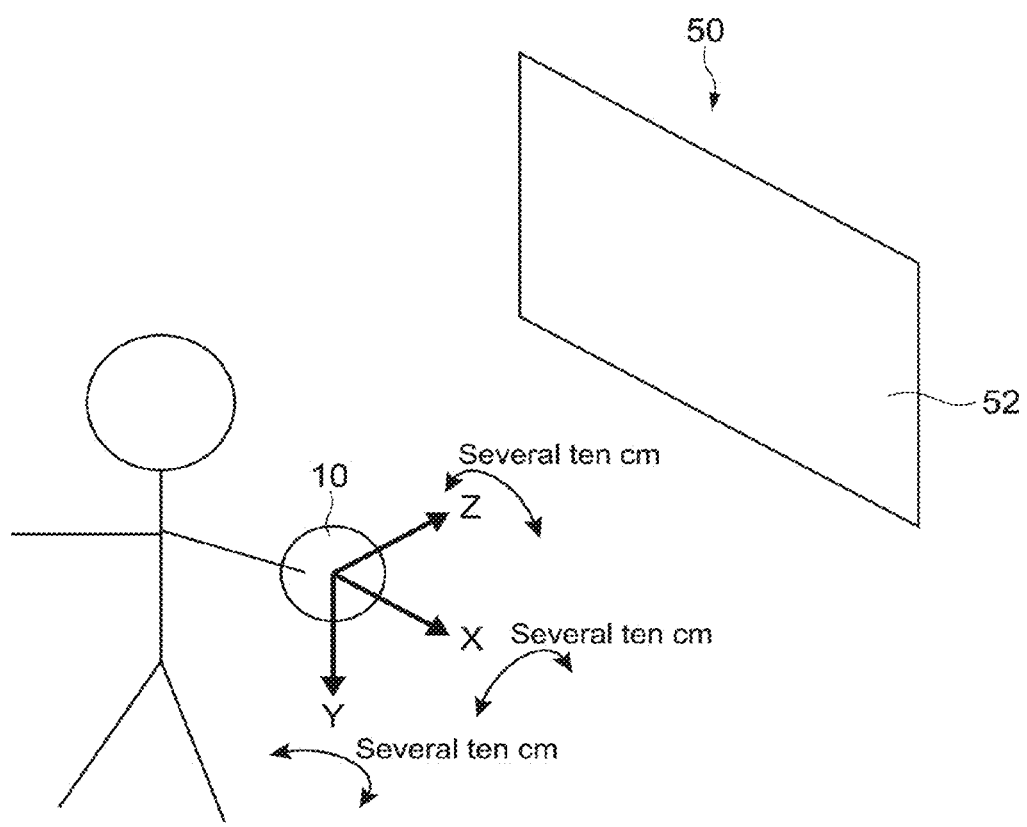
FIG. 11 is a diagram for explaining an operation range at a time a human being operates the operation device.

Here, as shown in FIG. 11, focusing on a state where a human being operates the operation device 10, a movement distance of the operation device 10 at a time a human being grabs the operation device 10 and moves an arm is several ten cm at most due to a limit on the length of an arm of human beings. As can be seen from the profile of FIG. 8, it is quite unlikely for human beings to unconsciously operate the operation device 10 such that characteristics of an acceleration and deceleration largely vary from the start of the movement to the end of the movement within the movement distance.

As described above, based on the fact that operational errors are suppressed during a first half period of the operation of the operation device 10 operated by the user and operational errors increase during a latter half period of the operation and from similarities in the acceleration and deceleration characteristics in an unconscious operation, the following can be said. Specifically, it is considered that a natural operational feeling for a user is not impaired even when correction processing having a concept of predicting the entire series of movement operations of the user from the start of the movement to the end based on information obtained during the first half period and reducing errors that are accumulated during the latter half period is carried out.

Figure 12:
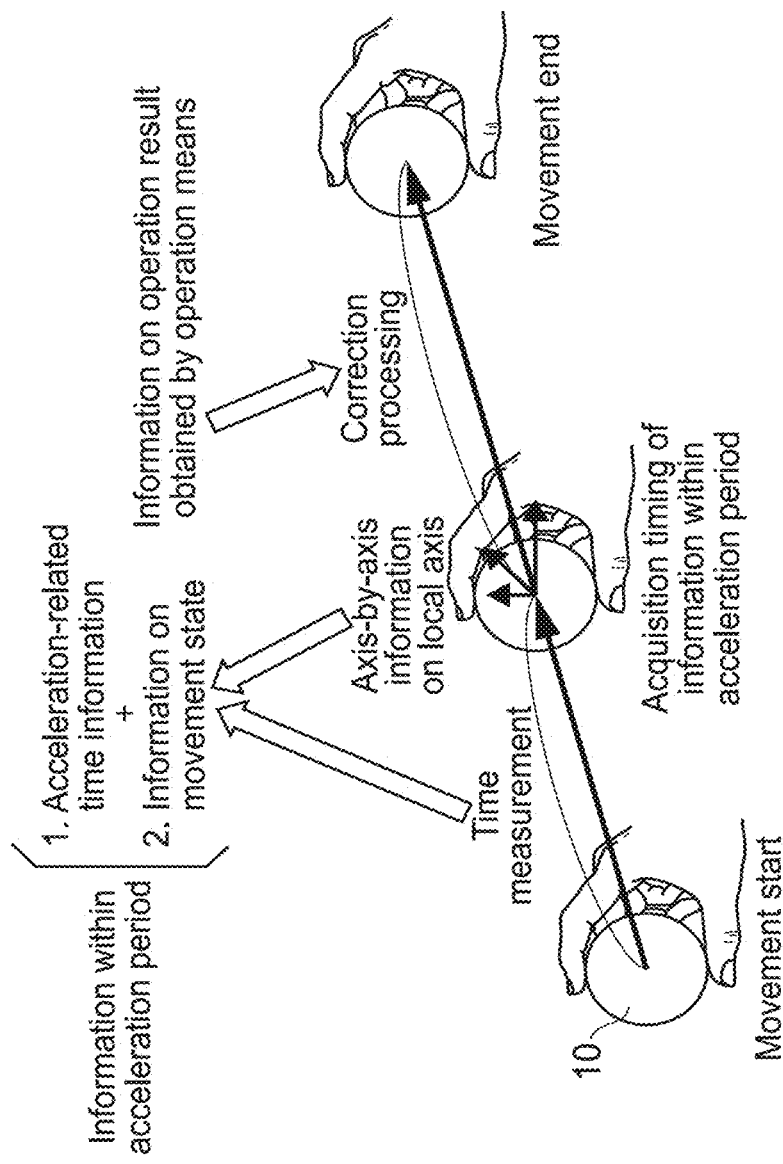
FIG. 12 is a diagram showing a general idea of correction processing according to the embodiment.

As the information obtained during the first half period, that is, the acceleration period, there are basically the following two types as shown in FIG. 12.

1. One is acceleration-related time information that is obtained within a partial period of the acceleration period for calculating an estimated movement end time as will be described later with reference to FIGS. 13 to 18. A content of "Correction processing method 1" described below is mainly on the time information.

2. Another one is information excluding the acceleration-related time information, the information being information on the movement state (operation state). It should be noted that in "Correction processing method 2" to be described later, information on an operation state obtained during a "period between an acceleration end time and a movement end time" instead of the "acceleration period" will be described.

<Correction Processing Method 1>

Figure 13:
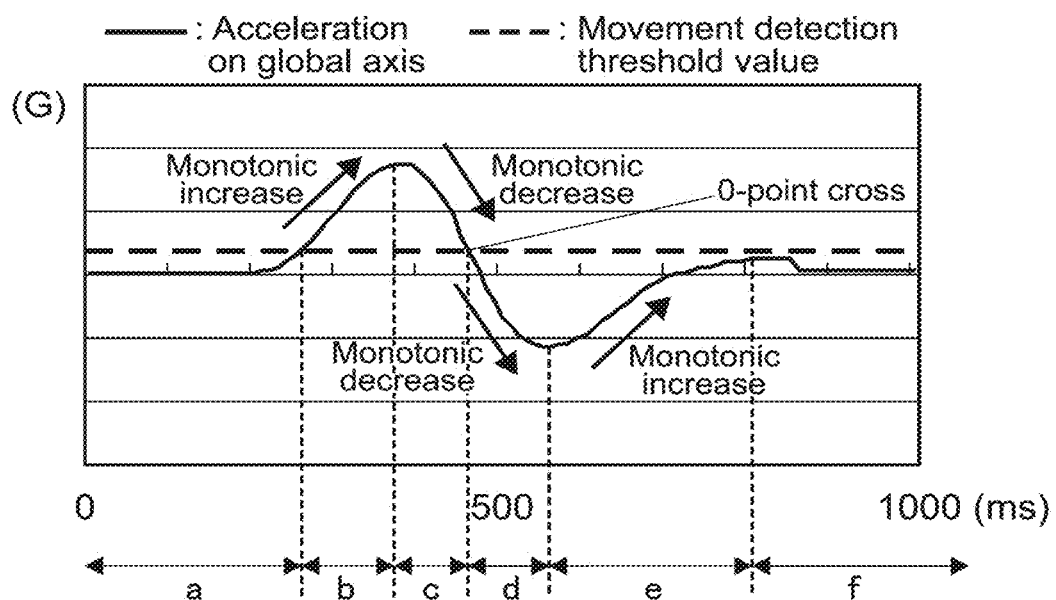
FIG. 13 is a diagram showing a profile of the acceleration output waveform regarding an arbitrary one of 3 local axes converted into a global coordinate system by a coordinate conversion unit.

FIG. 13 is a diagram showing a profile of the acceleration output waveform regarding an arbitrary one of the 3 local axes converted into the global coordinate system by the coordinate conversion unit 104. The profile information becomes source information for obtaining the "acceleration-related time information" as one of the "information obtained within the acceleration period" described above. In this embodiment, such an S-shaped profile is sectioned into 5 states (6 periods).

Periods a and f: Stop State

Period b: Acceleration state (period between movement (acceleration) start time and time at which acceleration reaches maximum acceleration value)

Period c: Acceleration state (period between time at which acceleration reaches maximum acceleration value and acceleration end time)

Period d: Deceleration state (period between acceleration end time and time at which acceleration reaches minimum acceleration value)

Period e: Deceleration state (period between time at which acceleration reaches minimum acceleration value and deceleration end time)

Here, the end time of the period e is a time at which the deceleration (negative acceleration) reaches 0, but when a human being operates the operation device 10, the time is close to or practically matches the movement end time.

Figure 14:
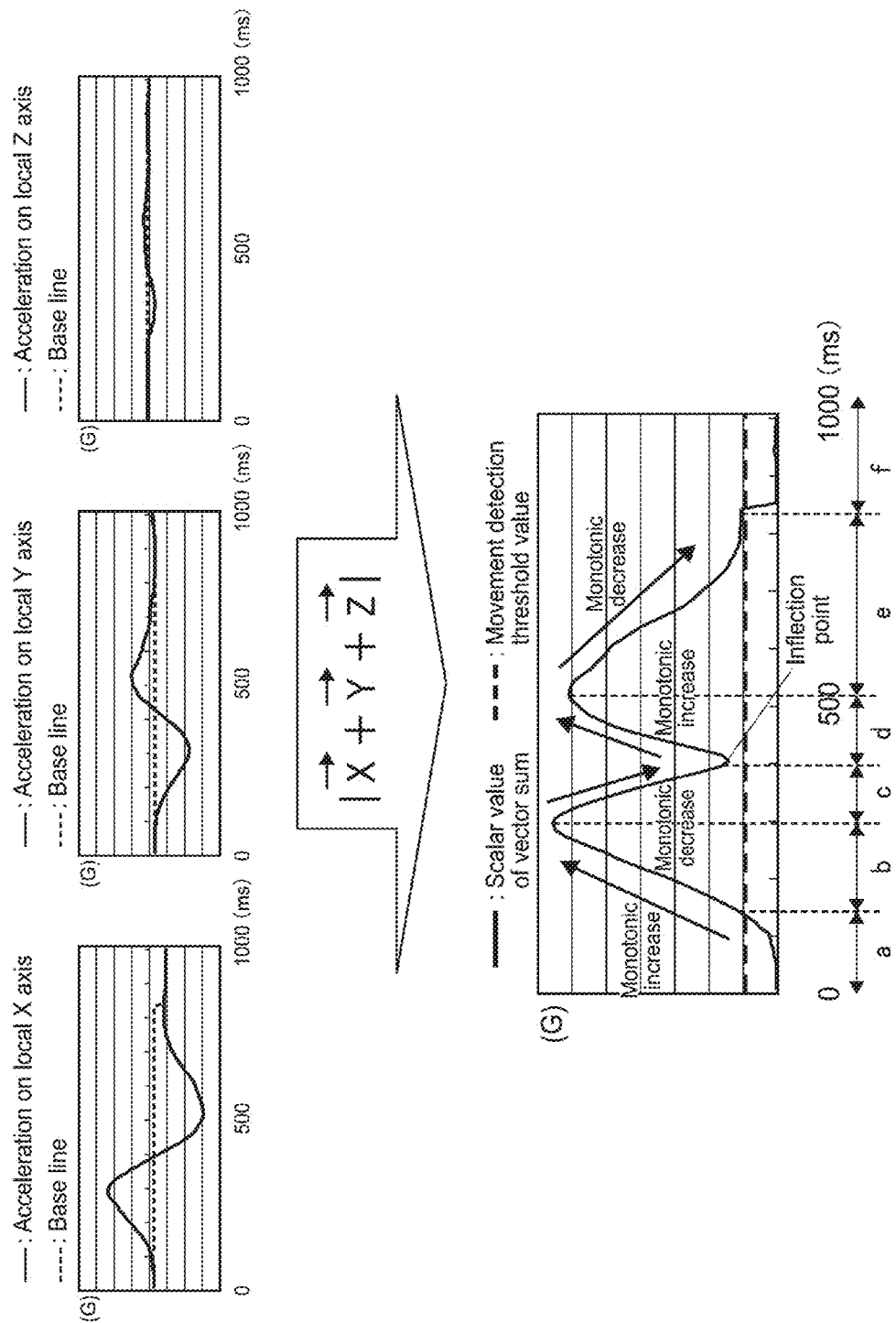
FIG. 14 is a diagram showing a profile of a scalar value as a vector sum of the accelerations.

As preprocessing of the correction of movement information by the correction operation unit 106, the movement state detection unit 103 obtains necessary information (acceleration-related time information) from profile information shown in FIG. 13, that is obtained after the coordinate conversion. Instead of the profile shown in FIG. 13, the movement state detection unit 103 may calculate a scalar value as a vector sum of accelerations obtained on the 3 local axes of the acceleration sensor 12 and generate a profile expressing the scalar values (M-shaped profile) as shown in FIG. 14.

Hereinafter, a configuration for obtaining necessary information based on the profile information shown in FIG. 14 will be described.

As the preprocessing of the correction of movement information by the correction operation unit 106, the movement state detection unit 103 calculates an estimated movement end time as an estimated time at which a movement ends, for example. At this time, the movement state detection unit 103 functions as a part of the correction unit.

FIGS. 15 to 18 are diagrams showing pattern examples of the calculation method of an estimated movement end time. In the examples, time information is used as the information obtained within the acceleration period. Specifically, the movement state detection unit 103 measures at least a partial time out of the acceleration period (periods b and c) using a timer and calculates the estimated movement end time based on the time information.

Figure 15:
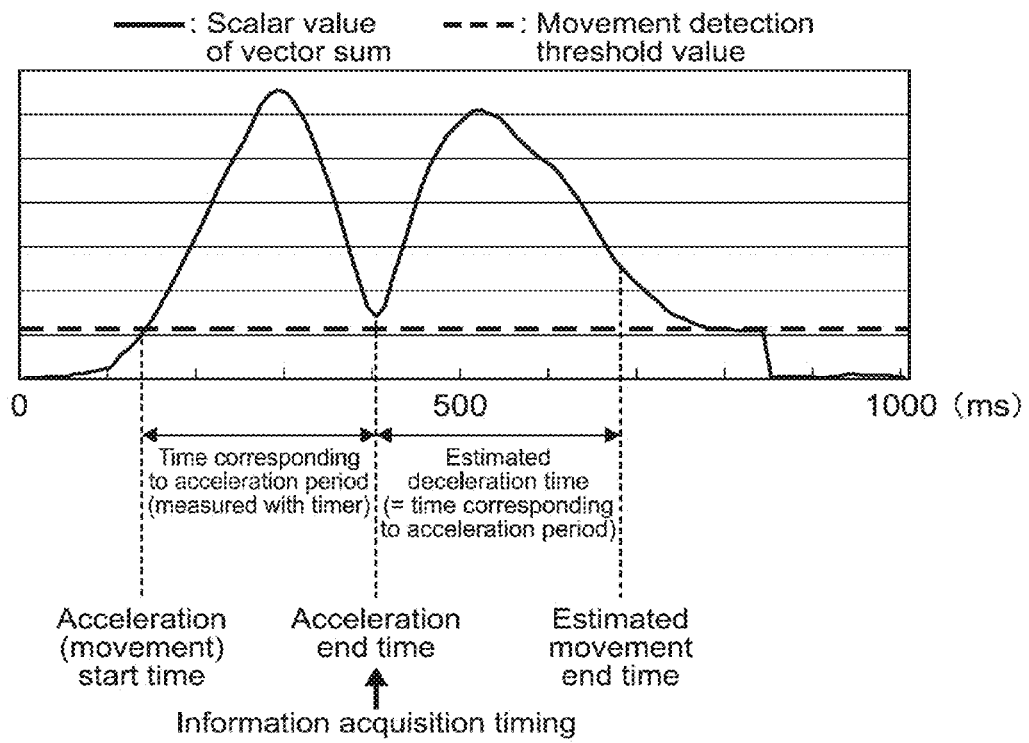
FIG. 15 is a diagram showing a pattern example of a calculation method of an estimated movement end time.

In the example shown in FIG. 15, a time corresponding to the acceleration period is measured, and a time at which the measured time corresponding to the acceleration period has elapsed since the acceleration end time is set as the estimated movement end time. In other words, the following is established.

Estimated movement end time=acceleration end time+time corresponding to acceleration period Specifically, a time corresponding to the deceleration period is estimated by applying the information of the acceleration period with less operational errors to the deceleration period. As described above, since the time corresponding to the acceleration period and the time corresponding to the deceleration period are known to take close values from the similarities in the acceleration and deceleration characteristics, the movement end time can be estimated by such a method without carrying out complicated operations.

Figure 16:
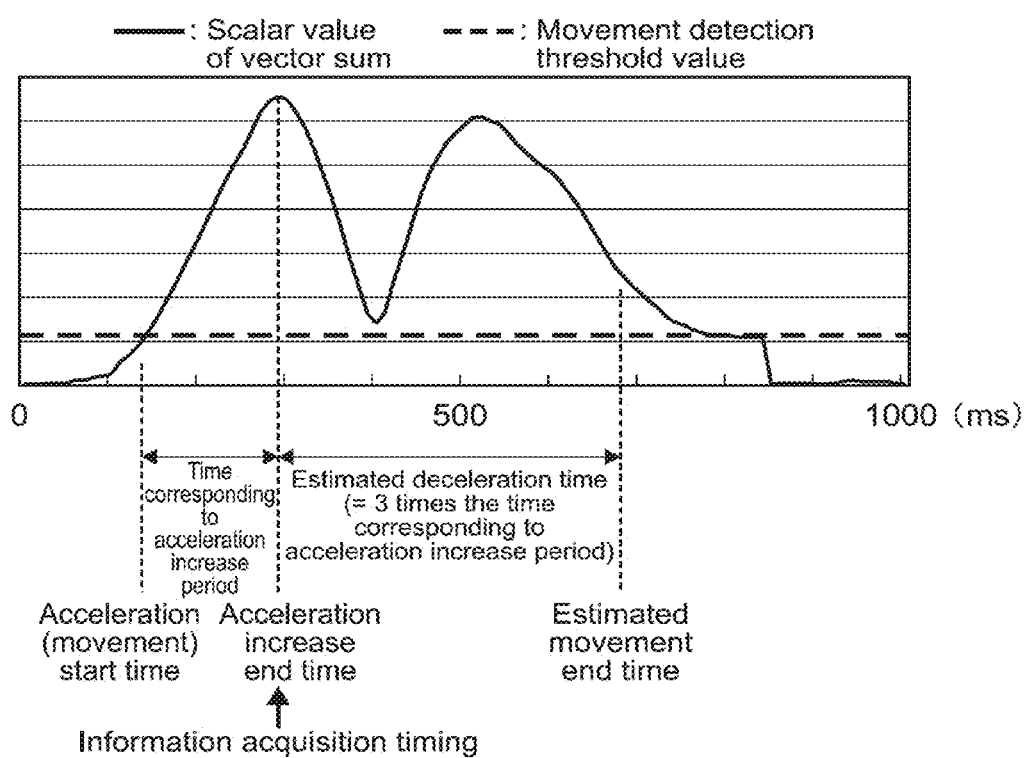
FIG. 16 is a diagram showing another pattern example of a calculation method of an estimated movement end time.

In the example shown in FIG. 16, a time corresponding to an acceleration increase period (period b) out of the acceleration period is measured, and a time at which a time which is 3 times the measured time has elapsed since the acceleration increase end time is set as the estimated movement end time. In other words, the following is established.

Figure 17:
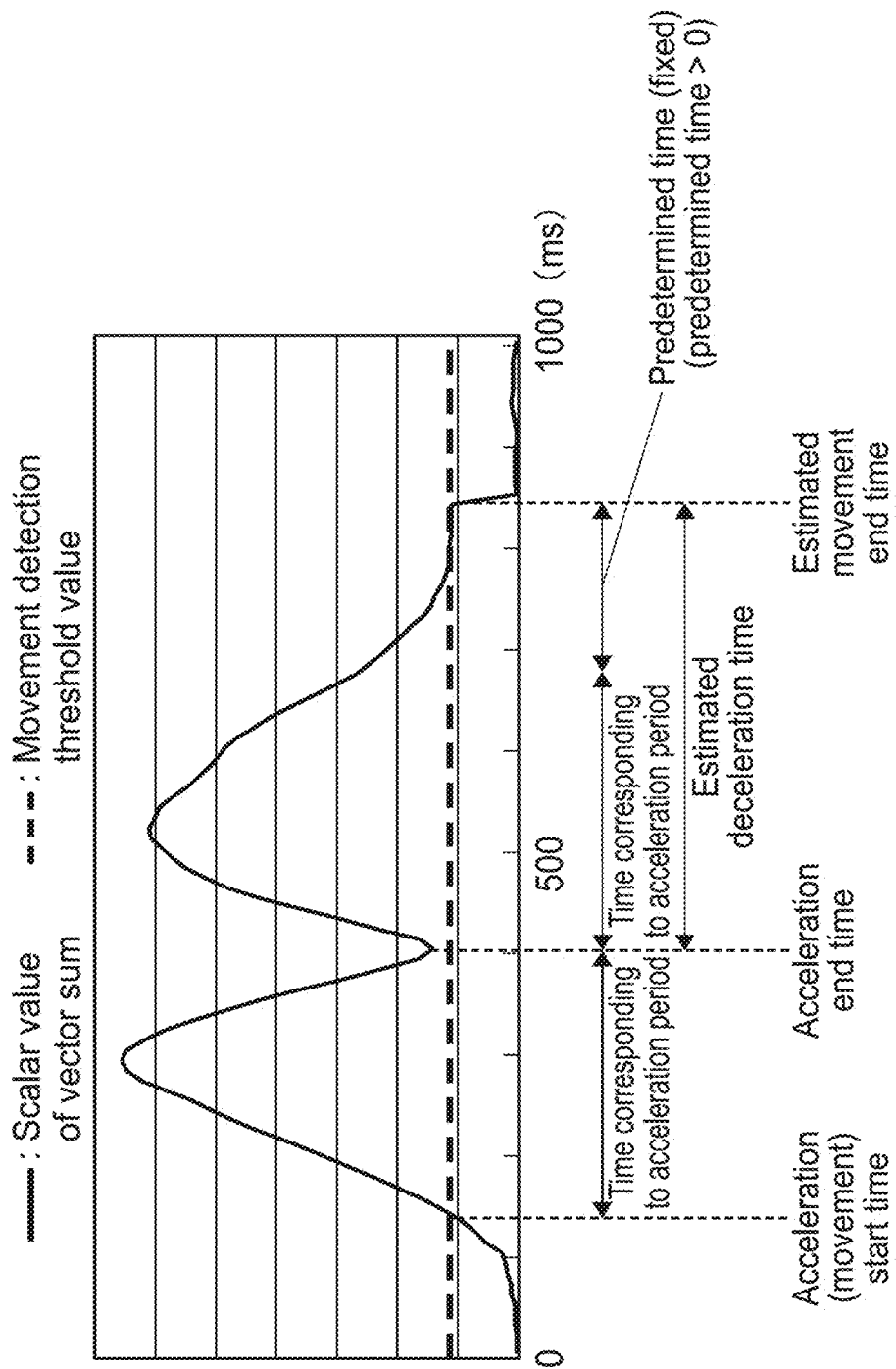
FIG. 17 is a diagram showing another pattern example of a calculation method of an estimated movement end time.

Estimated movement end time=acceleration increase end time+3*time corresponding to acceleration increase period In the example shown in FIG. 17, a time corresponding to the acceleration period is measured, and a time obtained by adding a predetermined time (e.g., fixed time) to a time at which the time corresponding to the acceleration period has elapsed since the acceleration end time is set as the estimated movement end time. In other words, the following is established.

Estimated movement end time=acceleration end time+time corresponding to acceleration period±predetermined time There are cases where the time between the acceleration end time and the movement end time becomes slightly longer than the time corresponding to the acceleration period. In this case, by adding the predetermined time, the movement end time can be estimated without carrying out complicated operations.

Figure 18:
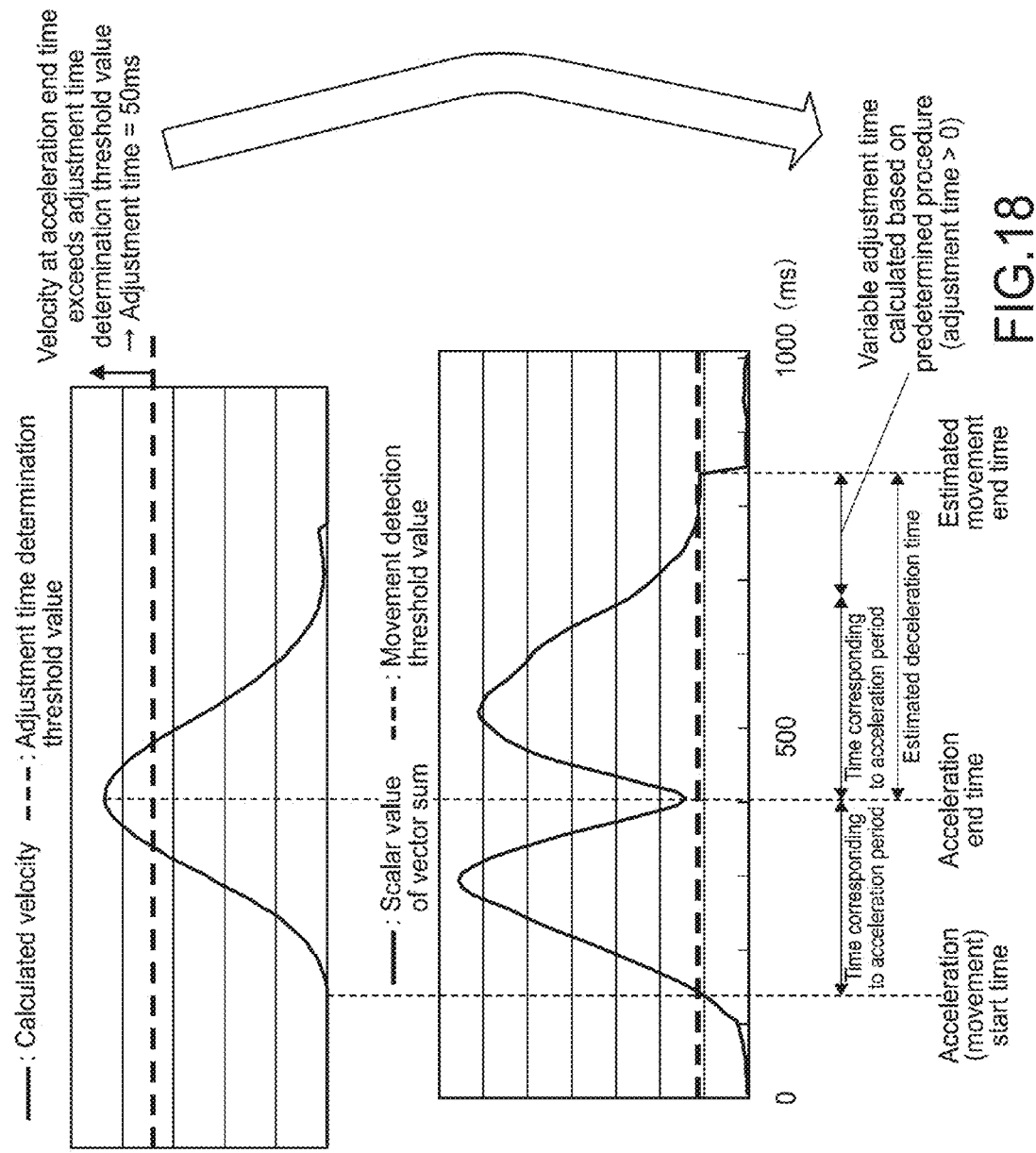
FIG. 18 is a diagram showing another pattern example of a calculation method of an estimated movement end time.

In the example shown in FIG. 18, the predetermined time is controlled variably. In other words, the predetermined time is an adjustment time. There are various methods for the variable control. For example, the profile shown in FIG. 18 shows a velocity out of the movement information calculated by the integration operation unit 105, and the adjustment time is controlled variably based on the velocity information. Specifically, a threshold value of the velocity is set, and a maximum velocity value is compared with the threshold value. When the maximum value exceeds the threshold value (in case of high-speed movement), the adjustment time is set to a (e.g., a=50 ms). When the maximum value is equal to or smaller than the threshold value (in case of low-speed movement), the adjustment time is set to b longer than a (e.g., b=200 ms). Two or more values may be set as the threshold value, or 3 or more values may be set as the adjustment time.

As described above, by dynamically changing the adjustment time based on the velocity, an accurate movement corresponding to the operation device 10 can be detected, and the movement can be reflected on the object.

As in the example shown in FIG. 18, the predetermined time may be controlled variably based on the movement distance. In other words, the movement distance calculated by the integration operation unit 105 is compared with a threshold value, and the adjustment time is determined based on information on the comparison result.

Figure 19:
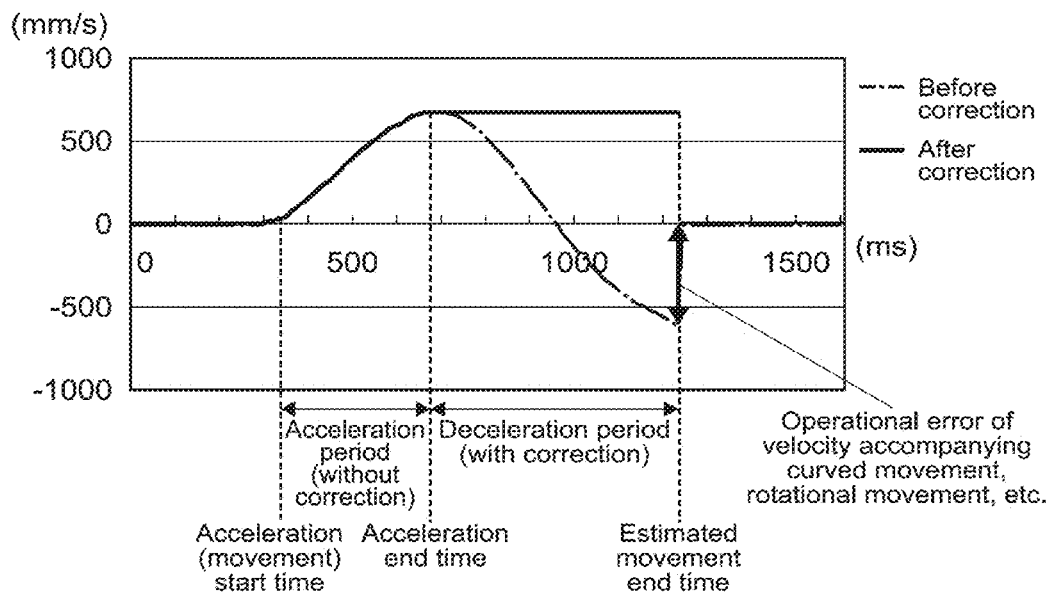
FIG. 19 is a diagram showing an example of correction processing related to the estimated movement end time in correction processing carried out by a correction operation unit.
Figure 20:
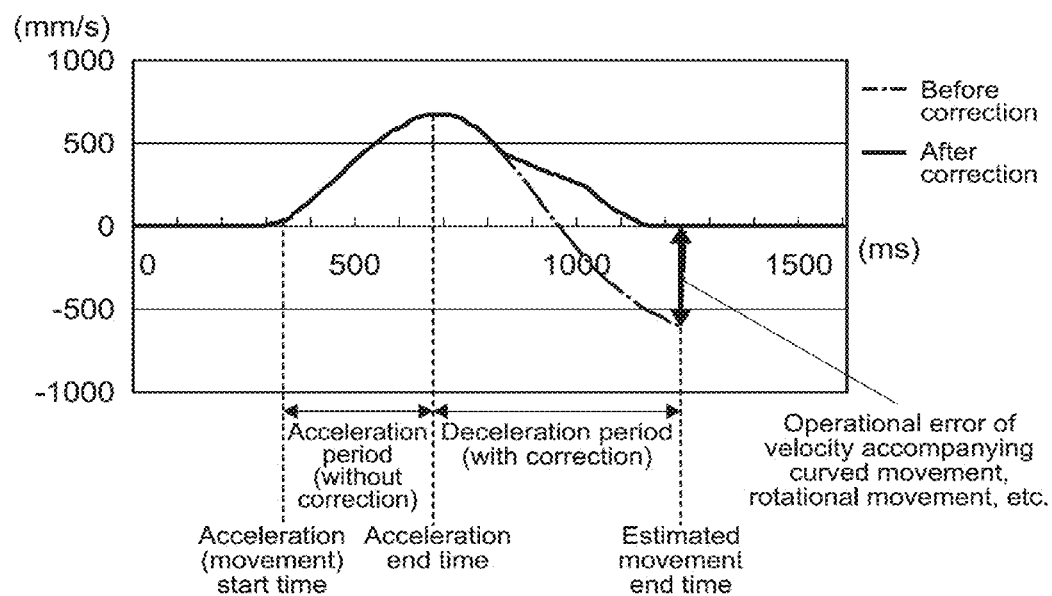
FIG. 20 is a diagram showing another example of the correction processing related to the estimated movement end time.
Figure 21:
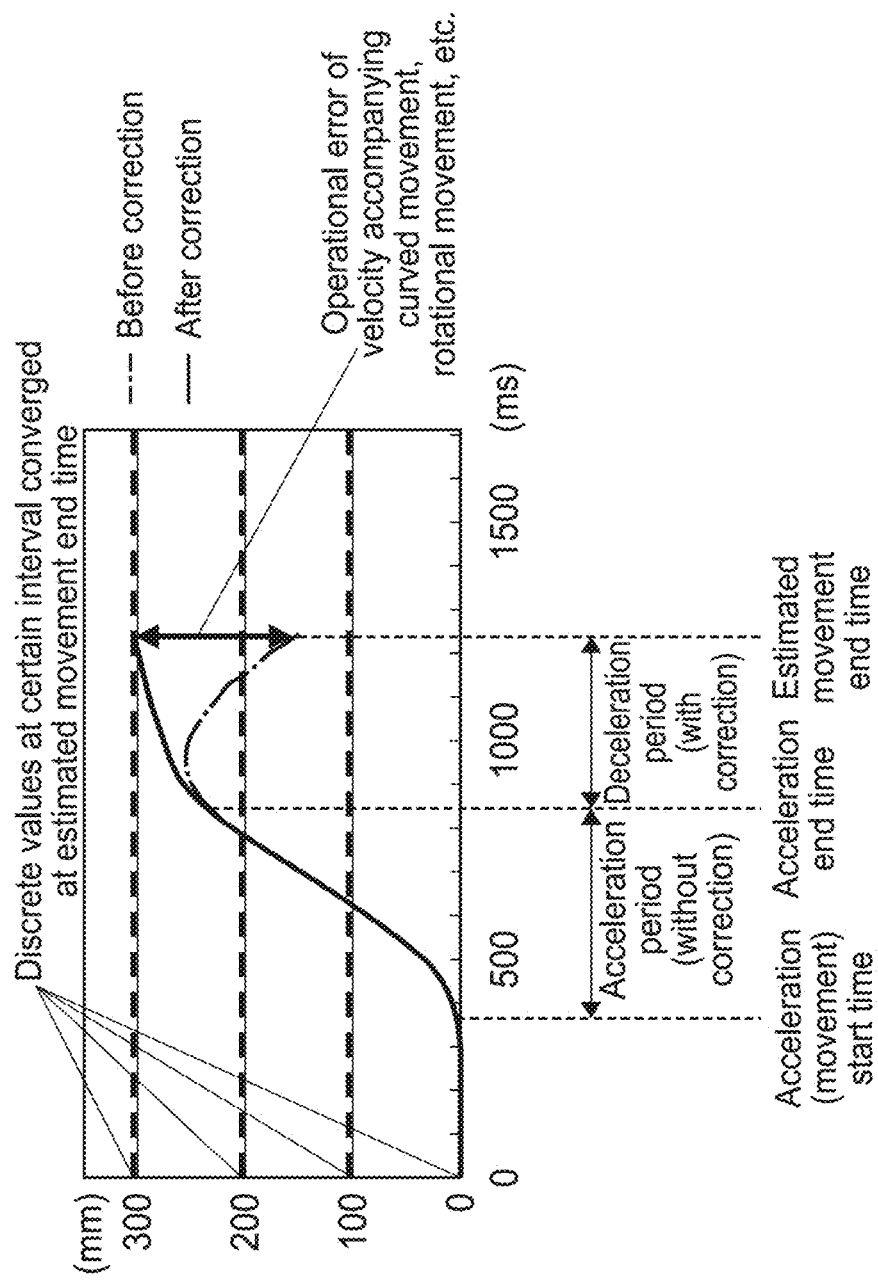
FIG. 21 is a diagram showing another example of the correction processing related to the estimated movement end time.

As described above, when the estimated movement end time is set, the correction operation unit 106 corrects the movement information that has been calculated by the integration operation unit 105 and is within a period between the acceleration end time and the set estimated movement end time, that is, the deceleration period. FIGS. 19 to 21 are diagrams each showing an example of the correction processing by the correction operation unit 106.

In the example shown in FIG. 19, the correction operation unit 106 successively corrects the velocity (velocity including operational error) calculated by the integration operation unit 105 so as to maintain the velocity at the acceleration end time, that is, a maximum value thereof during the period between the acceleration end time and the estimated movement end time. Instead of maintaining the velocity at a maximum value, the velocity may be kept constant near the maximum value. Then, the velocity becomes 0 at the estimated movement end time.

As an example of the application in the example shown in FIG. 19, there is display control in which, for example, when a pitcher throws a ball as an object in a baseball game, the ball is released from the pitcher's hand at a maximum velocity value and kept at a constant velocity at the maximum velocity value.

In the example shown in FIG. 20, the correction operation unit 106 successively corrects and decelerates the calculated velocity (velocity including operational error) after the acceleration end time such that the velocity becomes substantially 0 at the estimated movement end time. The profile of the velocity during the deceleration may be in a linear function or an exponent function. As a result, a natural movement of an object corresponding to the movement of the operation device 10 can be realized.

In the example shown in FIG. 21, the correction operation unit 106 converges the movement distance out of the movement information to discrete values at a certain interval before reaching the estimated movement end time. In this example, the interval of discrete values is set to 100 mm, but the value can be changed as appropriate.

As described above, in this embodiment, information on the operation result of the movement of the operation device 10 within the period between the acceleration end time and the movement end time is corrected based on the information obtained within the acceleration period having less operational errors. As a result, it becomes possible to prevent movement detection accuracy from being lowered due to an accumulation of errors caused by operation processing and realize practical movement detection accuracy.

<Correction Processing Method 2>

Hereinafter, correction processing different from the correction processing described above will be described. In this correction processing, movement information is corrected based on information on an operation state of the operation device 10 operated by the user, that is obtained within at least a partial period out of the period between the acceleration end time and the estimated movement end time.

As described above, the information on an operation state refers to detection information obtained by the sensors 12 to 15, information obtained from a sum pressure calculated by the sum pressure operation unit 101, information obtained from a signal from the mechanical switch 16, and the like. The information on an operation state is obtained by the movement state detection unit 103 which, at this time, functions as an operation state acquisition unit.

Figure 22:
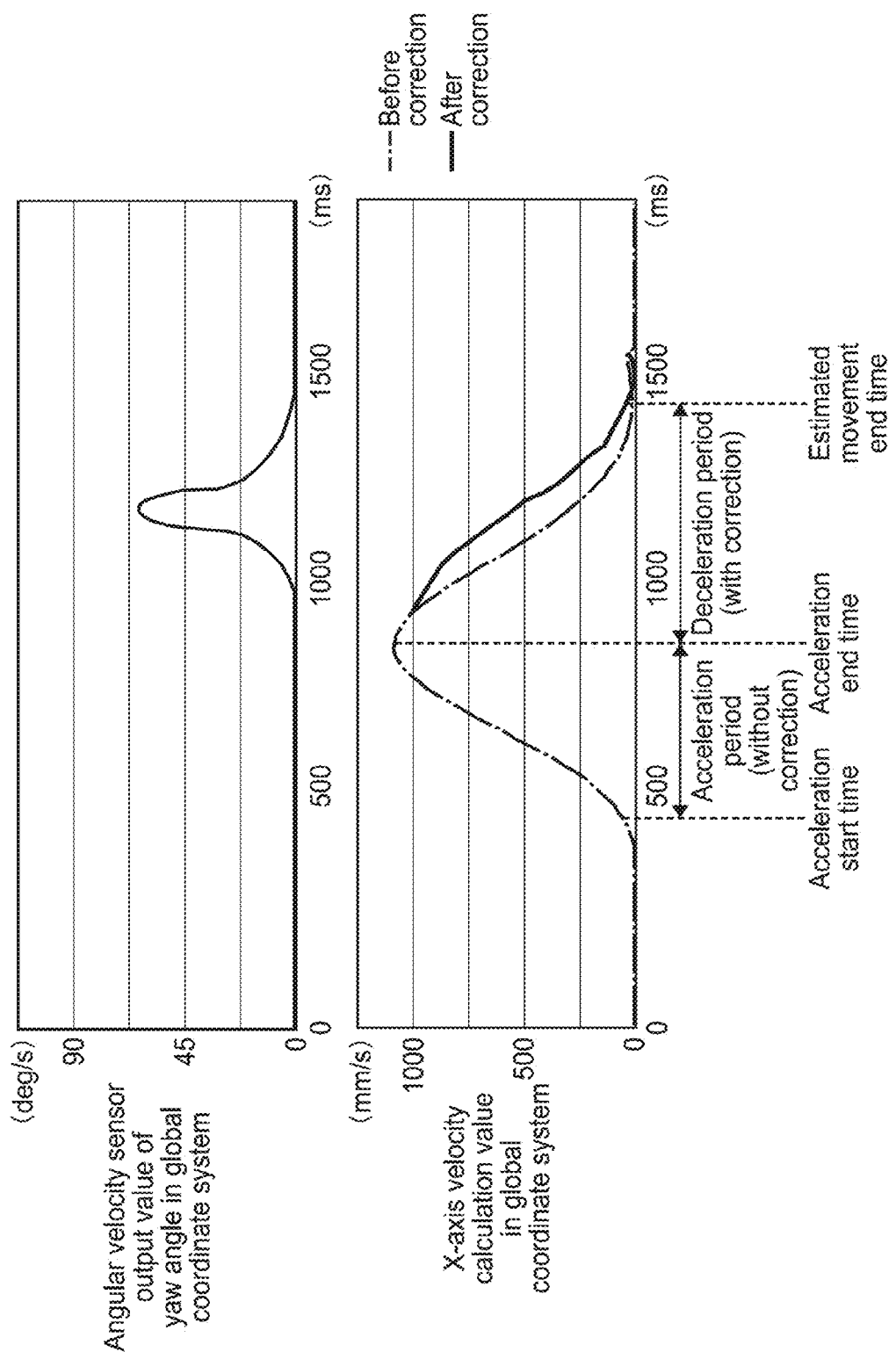
FIG. 22 is a diagram showing an example of correcting movement information according to an operation state obtained within a deceleration period in the correction processing carried out by the correction operation unit.
Figure 23:
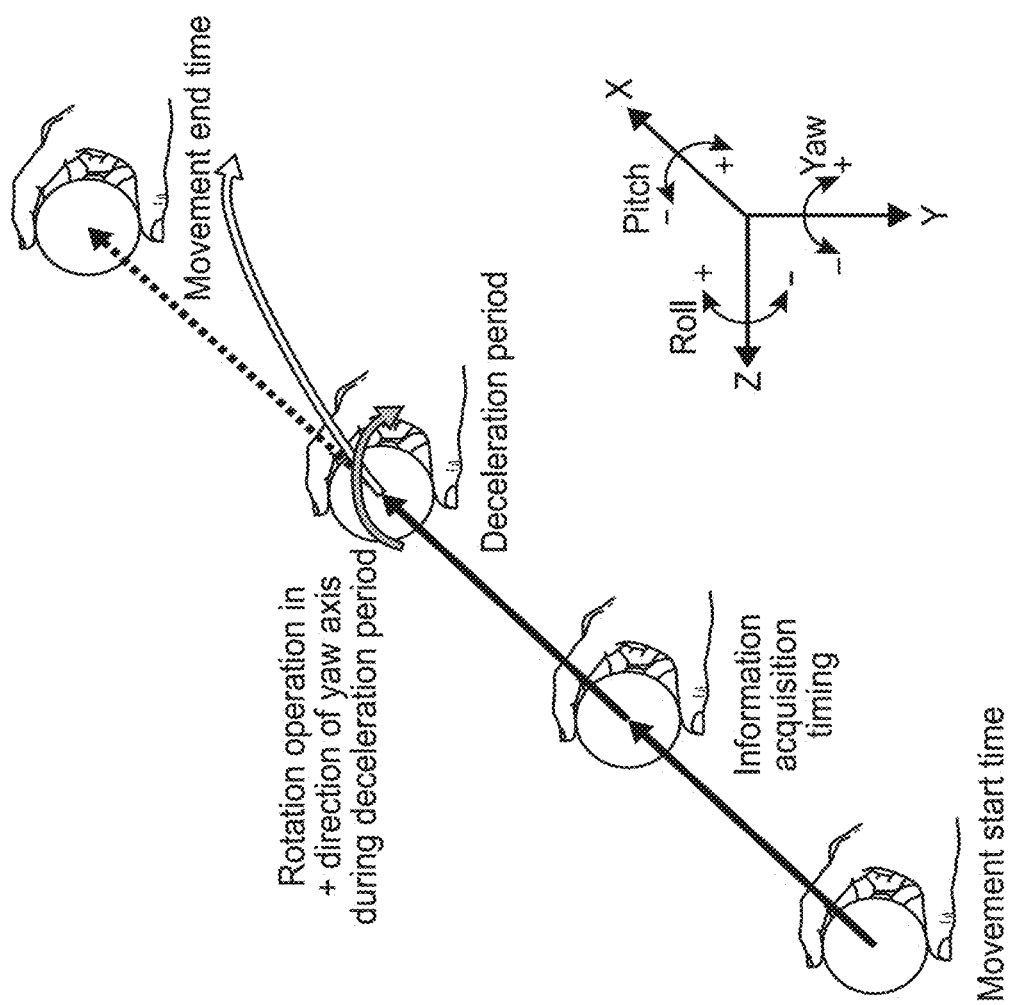
FIG. 23 is a conceptual diagram of the correction processing shown in FIG. 22.

FIGS. 22 and 23 are diagrams for explaining an example of the correction processing. The user moves the operation device 10 along the global X axis and turns the operation device 10 in a positive direction about the X axis (yaw angle) as shown in FIG. 23 within the period between the acceleration end time and the estimated movement end time. In other words, in the operation, the user horizontally moves the operation device 10 in the right-hand direction in the global coordinate system and pulls it forward in the latter half period, for example. The rotational velocity, that is, the angular velocity is detected by the angular velocity sensor 13.

In FIG. 23, the "information acquisition timing" is a timing for obtaining information within the acceleration period as described above, that is, a timing for obtaining, for example, acceleration-related time information.

The movement state detection unit 103 only needs to judge that the operation is an operation intended by the user when the detected angular velocity exceeds a threshold value. When such a user-intended rotational operation is made, the velocity profile within the deceleration period, for example, is successively corrected based on the rotational angle as shown in the graph on the lower side of FIG. 22. When an object displayed on the display unit 52 is a 3D object, the 3D object is displayed as if it is approaching in the latter half period by the correction processing.

The correction processing may be executed in combination with the correction processing shown in FIG. 20. In this case, with the correction processing shown in FIG. 20 being the preprocessing, the correction shown in FIGS. 22 and 23 is executed after that.

Figure 24:
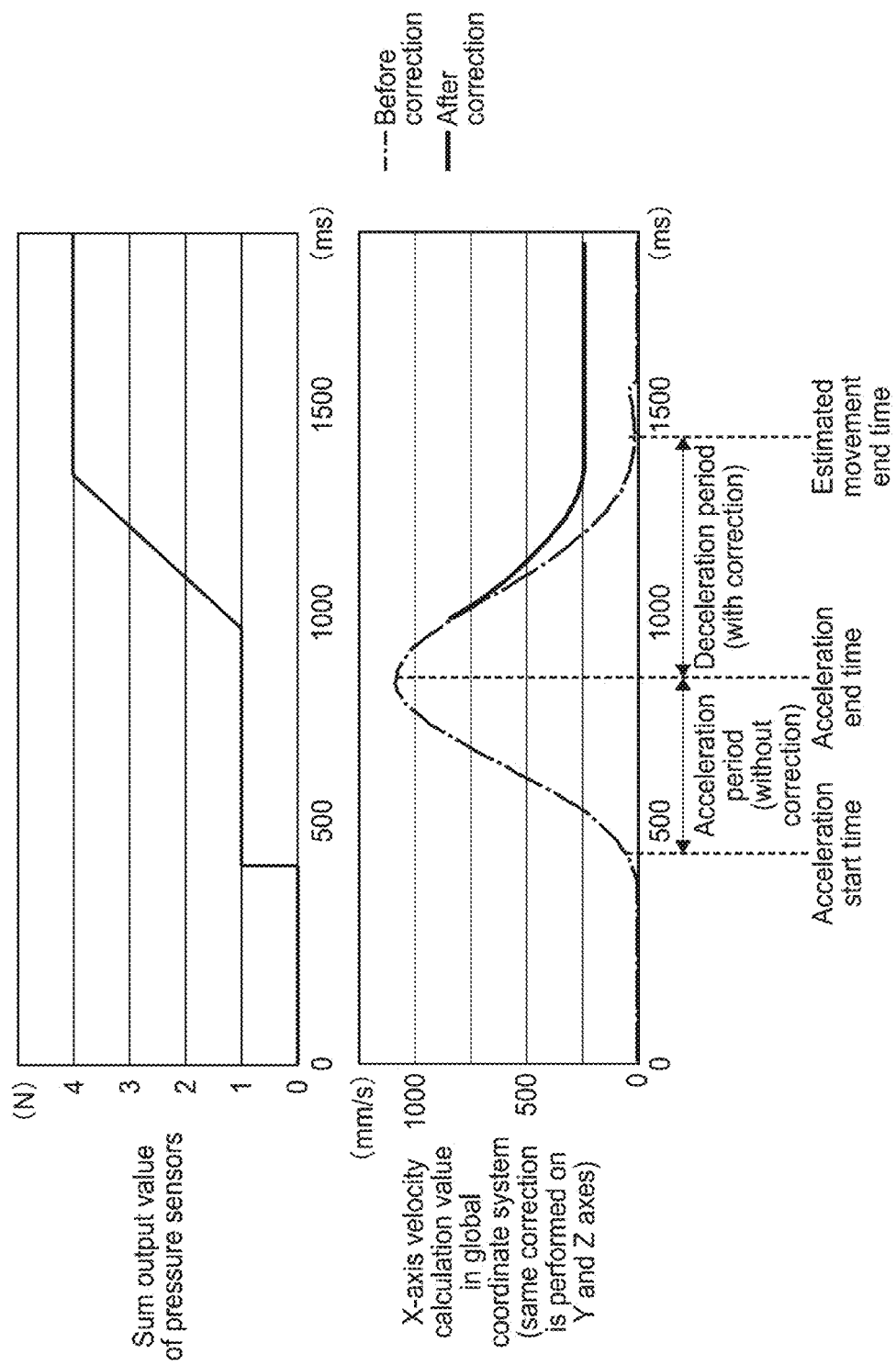
FIG. 24 is a diagram showing another example of correcting the movement information according to the operation state obtained within the deceleration period in the correction processing carried out by the correction operation unit.
Figure 25:
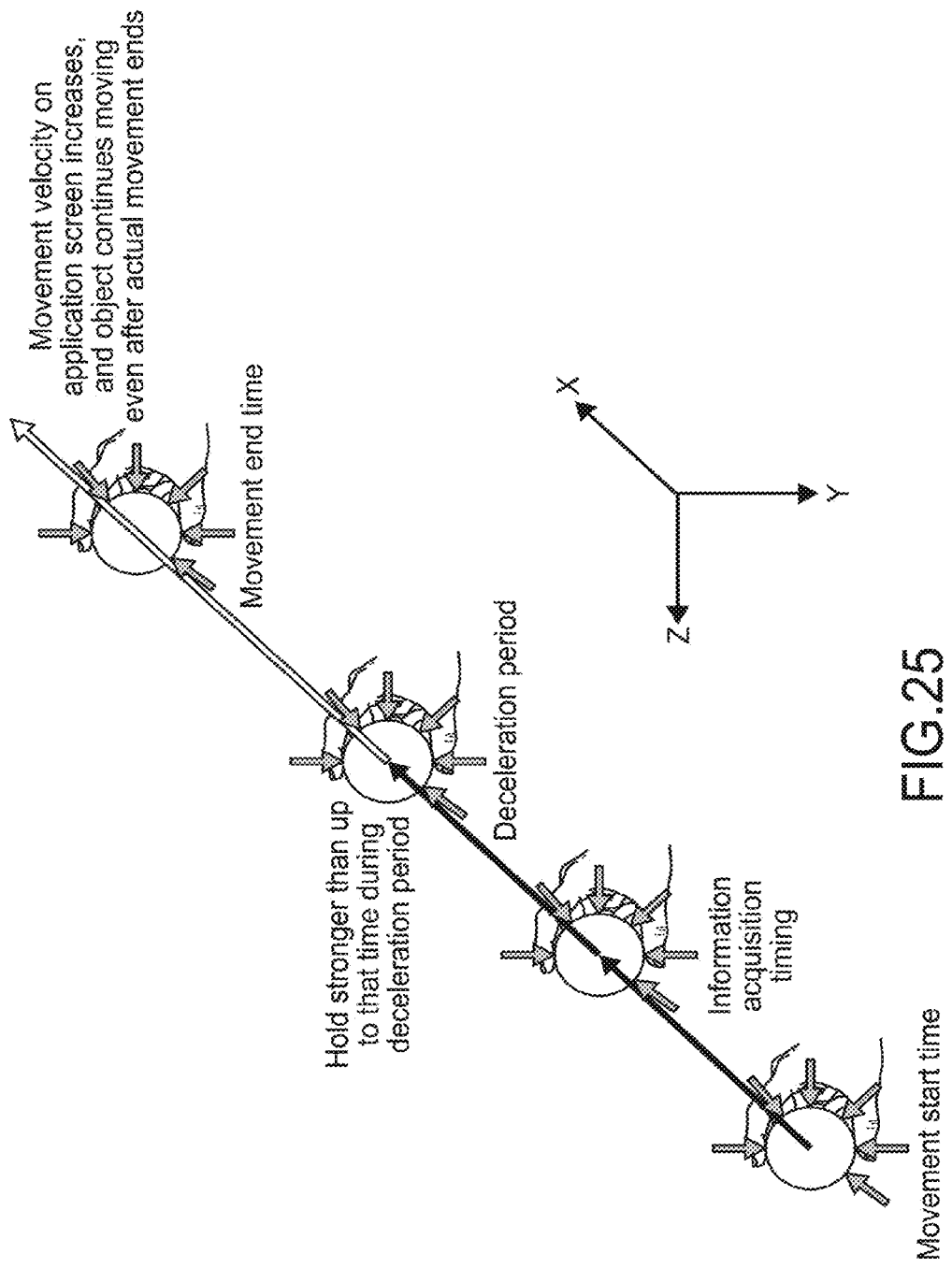
FIG. 25 is a conceptual diagram of the correction processing shown in FIG. 24.

FIGS. 24 and 25 are diagrams for explaining another example of the correction processing. In this example, information on a sum pressure obtained by the group of pressure sensors 15 is used. When the sum pressure that the user holds the operation device 10 with during the deceleration period is intentionally made larger than the sum pressure during the acceleration period, the velocity or movement distance is increased based on the detected sum pressure. The correction may be carried out successively based on fluctuations of the sum pressure. A threshold judgment only needs to be used in the judgment on whether the operation is intentional or not. When the correction processing as described above is executed, the object does not stop at the estimated movement end time and is displayed so as to move at a predetermined velocity. In other words, even after the user stops moving the operation device 10, the object is displayed so as to continue moving.

Conversely, when the sum pressure during the deceleration period is made smaller than that obtained during the acceleration period, the velocity or movement distance is corrected so as to decrease. As a result, display is made such that the object stops before the estimated movement end time Alternatively, when the sum pressure is made large during the deceleration period, the velocity or movement distance may be made small (large) based on the detected sum pressure.

As will be described in <Correction processing method 3>, the correction processing as described above can also be realized by changing the estimated movement end time according to the operation state.

In addition to the correction processing shown in FIGS. 22 to 25, the movement information may be corrected based on, for example, an acceleration detected by the acceleration sensor 12 or a signal detected by the mechanical switch during the deceleration period. As an example of correcting movement information based on the detected acceleration, an example of displaying an object such that, when an acceleration is detected in the same direction up to that point during the deceleration period, the object continues moving in that direction without stopping at the estimated movement end time can also be realized.

As an example of correcting movement information based on a signal from the mechanical switch, an example in which the movement information is corrected as described above with reference to, for example, FIGS. 19 to 25 when the mechanical switch is turned on during the deceleration period and the correction processing is canceled when the mechanical switched is turned off during the deceleration period can also be realized.

<Correction Processing Method 3>

In <Correction processing method 2> above, the example in which the movement information is corrected based on the operation state during the deceleration period has been described. As another correction processing, the estimated movement end time is changed based on information on an acceleration, angular velocity, or sum pressure detected within the deceleration time or a signal from the mechanical switch.

For example, when an acceleration exceeds a threshold value during the deceleration period, correction processing for setting the estimated movement end time ahead (delaying) can be realized. The same holds true for a case where an angular velocity exceeds a threshold value during the deceleration period.

For example, correction processing in which, the estimated movement end time is delayed a predetermined time when a sum pressure becomes larger than that up to that time during the deceleration period and the estimated movement end time is set ahead a predetermined time when the sum pressure becomes smaller than that up to that time, or vice versa can be realized.

Alternatively, when the user stops holding the operation device 10 during the deceleration period (when sum pressure practically becomes 0), the estimated movement end time may be set at the time (or right after the time) the sum pressure practically becomes 0. In this case, the displayed object stops at the timing at which the user stops holding the operation device 10.

Alternatively, correction processing in which, when the mechanical switch is turned on during the deceleration period, the estimated movement end time is unlimitedly delayed until the switch is turned off can be realized.

Other Embodiments

The embodiment of the present disclosure is not limited to the embodiment described above, and various other embodiments can also be realized.

As described with reference to FIG. 4, for example, in the embodiment above, the display device 50 has executed the processing at the respective units 101 to 107. However, the operation device 10 may execute at least the partial processing of the respective units 101 to 107. In other words, the operation device 10 may function as an information processing apparatus having the characteristics of this embodiment.

The operation object of the operation device 10 is not limited to an object displayed on the display device 50 and may be, for example, a remotely-controlled machine and robot.

The present disclosure contains subject matter related to that disclosed in Japanese Priority Patent Application JP 2011-001240 filed in the Japan Patent Office on Jan. 6, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a storage unit configured to store instructions;
an acceleration sensor configured to:
  detect an acceleration of the information processing apparatus; and
  obtain acceleration information within an acceleration period, wherein the acceleration information is associated with the detected acceleration; and
a central processing unit (CPU) configured to execute the instructions to:
  receive the acceleration information associated with the acceleration detected by the acceleration sensor;
  determine movement information as information on a velocity of the information processing apparatus, based on the received acceleration information;
  determine a maximum value of the velocity based on the movement information;
  measure a partial time period within the acceleration period, wherein
    the partial time period is a first time period between an acceleration start time and an acceleration end time,
    the acceleration start time is a first time at which the information processing apparatus starts to move,
    the acceleration end time is a second time at which a first value of the acceleration becomes zero from a positive value of the acceleration, the positive value of the acceleration is associated with a positive direction of the acceleration,
    the acceleration end time is subsequent to the acceleration start time and prior to a third time at which a second value of the acceleration reaches to zero from a negative value of the acceleration, and the negative value of the acceleration is associated with a negative direction of the acceleration;
  dynamically set an adjustment time period to a second time period in a case where the determined maximum value of the velocity is greater than a threshold velocity value;
  dynamically set the adjustment time period to a third time period in a case where the determined maximum value of the velocity is less than the threshold velocity value, wherein the third time period is longer than the second time period;

determine an estimated movement end time as an estimated time at which the movement of the information processing apparatus ends, wherein
the determination of the estimated movement end time is based on one of addition of the adjustment time period to a fourth time or subtraction of the adjustment time period from the fourth time, and
the fourth time is a time at which the measured partial time period has elapsed after the acceleration end time;
correct the determined movement information that is within a fourth time period, wherein
the fourth time period is between the acceleration end time and the estimated movement end time,
the correction of the determined movement information is based on the received acceleration information, and
the estimated movement end time is subsequent to the acceleration end time; and
control movement of an object displayed on a display screen, wherein the movement of the object is controlled based on the corrected movement information and based on an operation of the information processing apparatus.

2. The information processing apparatus according to claim 1, wherein the CPU is further configured to change a value of the velocity to a constant value from the acceleration end time and change the value of the velocity to 0 at the estimated movement end time.

3. The information processing apparatus according to claim 1, wherein the CPU is further configured to determine the estimated movement end time based on an elapse of the acceleration period from the acceleration end time.

4. The information processing apparatus according to claim 1, wherein the CPU is further configured to:
acquire information associated with an operation state of the information processing apparatus; and
correct the determined movement information based on the acquired information that is within the fourth time period.

5. The information processing apparatus according to claim 4, further comprising an angular velocity sensor configured to detect an angular velocity of the information processing apparatus,
wherein the CPU is further configured to:
acquire angular velocity information associated with the angular velocity; and
correct the determined movement information based on the acquired angular velocity information.

6. The information processing apparatus according to claim 4, further comprising a pressure sensor configured to detect a pressure applied on the information processing apparatus,
wherein the CPU is further configured to:
acquire pressure information that corresponds to the detected pressure; and
correct the determined movement information based on the acquired pressure information.

7. The information processing apparatus according to claim 4, further comprising a mechanical switch configured to detect a signal,
wherein the CPU is further configured to:
acquire the signal detected by the mechanical switch; and
correct the determined movement information based on the acquired signal.

8. The information processing apparatus according to claim 1, further comprising an angular velocity sensor configured to detect an angular velocity of the information processing apparatus,
wherein the CPU is further configured to:
receive, in a first coordinate system, angular velocity information associated with the angular velocity detected by the angular velocity sensor; and
convert the angular velocity information from the first coordinate system to a second coordinate system, wherein the determination of the movement information is based on the converted angular velocity information.

9. The information processing apparatus according to claim 8, wherein the CPU is further configured to convert coordinates of an angle into the second coordinate system, and wherein the coordinates of the angle are obtained by integration of the angular velocity.

10. The information processing apparatus according to claim 8, wherein the first coordinate system is changeable based on a user operation, and wherein the second coordinate system remains fixed.

11. An information processing system, comprising:
an operation device that includes:
an acceleration sensor configured to:
detect an acceleration of the operation device; and
obtain acceleration information within an acceleration period, wherein the acceleration information is associated with the detected acceleration; and
a transmission unit configured to transmit the acceleration information associated with the acceleration detected by the acceleration sensor; and
a control apparatus, comprising:
a display unit configured to display an object; and
a central processing unit (CPU) configured to:
receive the acceleration information transmitted by the transmission unit of the operation device;
determine movement information as information on a velocity of the operation device, based on the received acceleration information;
determine a maximum value of the velocity based on the movement information;
measure a partial time period within the acceleration period, wherein
the partial time period is a first time period between an acceleration start time and an acceleration end time,
the acceleration start time is a first time at which the operation device starts to move,
the acceleration end time is a second time at which a first value of the acceleration becomes zero from a positive value of the acceleration, the positive value of the acceleration is associated with a positive direction of the acceleration,
the acceleration end time is subsequent to the acceleration start time and prior to a third time at which a second value of the acceleration reaches to zero from a negative value of the acceleration, and the negative value of the acceleration is associated with a negative direction of the acceleration;
dynamically set an adjustment time period to a second time period in a case where the determined maximum value of the velocity is greater than a threshold velocity value;
dynamically set the adjustment time period to a third time period in a case where the determined maximum value of the velocity is less than the threshold velocity value, wherein the third time period is longer than the second time period;

determine an estimated movement end time as an estimated time at which the movement of the operation device ends, wherein
the determination of the estimated movement end time is based on one of addition of the adjustment time period to a fourth time or subtraction of the adjustment time period from the fourth time, and
the fourth time is a time at which the measured partial time period has elapsed after the acceleration end time;

correct the determined movement information that is within a fourth time period, wherein
the fourth time period is between the acceleration end time and the estimated movement end time,
wherein the correction of the determined movement information is based on the received acceleration information, and
the estimated movement end time is subsequent to the acceleration end time; and control movement of the object based on the corrected movement information and an operation of the operation device.

12. An information processing method, comprising:
in an information processing apparatus:
detecting, by an acceleration sensor, an acceleration of the information processing apparatus;
obtaining, by the acceleration sensor, acceleration information within an acceleration period, wherein the acceleration information is associated with the detected acceleration;
receiving, by a central processing unit (CPU) in the information processing apparatus, the acceleration information associated with the acceleration detected by the acceleration sensor;
determining, by the CPU, movement information as information on a velocity of the information processing apparatus, based on the received acceleration information;
determining, by the CPU, a maximum value of the velocity based on the movement information;
measuring, by the CPU, a partial time period within the acceleration period, wherein
the partial time period is a first time period between an acceleration start time and an acceleration end time,
the acceleration start time is a first time at which the information processing apparatus starts to move,
the acceleration end time is a second time at which a first value of the acceleration becomes zero from a positive value of the acceleration, the positive value of the acceleration is associated with a positive direction of the acceleration,
the acceleration end time is subsequent to the acceleration start time and prior to a third time at which a second value of the acceleration reaches to zero from a negative value of the acceleration, and the negative value of the acceleration is associated with a negative direction of the acceleration;

dynamically setting, by the CPU, an adjustment time period to a second time period in a case where the determined maximum value of the velocity is greater than a threshold velocity value;

dynamically setting, by the CPU, the adjustment time period to a third time period in a case where the determined maximum value of the velocity is less than the threshold velocity value, wherein the third time period is longer than the second time period;

determining, by the CPU, an estimated movement end time as an estimated time at which the movement of the information processing apparatus ends, wherein
the determination of the estimated movement end time is based on one of addition of the adjustment time period to a fourth time or subtraction of the adjustment time period from the fourth time, and
the fourth time is a time at which the measured partial time period has elapsed after the acceleration end time;

correcting, by the CPU, the determined movement information that is within a fourth time period, wherein
the fourth time period is between the acceleration end time and the estimated movement end time,
the correction of the determined movement information is based on the received acceleration information, and
the estimated movement end time is subsequent to the acceleration end time; and controlling, by the CPU, movement of an object displayed on a display screen, wherein the movement of the object is controlled based on the corrected movement information and based on an operation of the information processing apparatus.

* * * * *